US010850839B2

(12) United States Patent
Xu et al.

(10) Patent No.: US 10,850,839 B2
(45) Date of Patent: *Dec. 1, 2020

(54) UNMANNED AERIAL VEHICLE (UAV) FOR COLLECTING AUDIO DATA

(71) Applicant: SZ DJI TECHNOLOGY CO., LTD., Shenzhen (CN)

(72) Inventors: Xingwang Xu, Shenzhen (CN); Zisheng Cao, Shenzhen (CN); Mingyu Wang, Shenzhen (CN); Xiaozheng Tang, Shenzhen (CN); Hualiang Qiu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/861,033

(22) Filed: Jan. 3, 2018

(65) Prior Publication Data

US 2018/0105270 A1    Apr. 19, 2018

Related U.S. Application Data

(63) Continuation of application No. 14/796,717, filed on Jul. 10, 2015, now Pat. No. 9,889,931, which is a (Continued)

(51) Int. Cl.
*B64C 39/02* (2006.01)
*H04R 1/10* (2006.01)
(Continued)

(52) U.S. Cl.
CPC ........ *B64C 39/024* (2013.01); *H04R 1/1083* (2013.01); *H04R 3/005* (2013.01);
(Continued)

(58) Field of Classification Search
CPC ............ B64C 39/024; B64C 2201/024; B64C 2201/123; B64C 2201/027;
(Continued)

(56) References Cited

U.S. PATENT DOCUMENTS 5,224,168 A * 6/1993 Martinez ............ G10K 11/1784
                                                           381/71.8
5,398,286 A    3/1995 Balestri et al.
(Continued)

FOREIGN PATENT DOCUMENTS

CN    1313212 A    9/2001
CN    1612036 A    5/2005
(Continued)

OTHER PUBLICATIONS

The European Patent Office (EPO) European Search Report and Search Opinion Application No. 14900504.3 dated Jul. 26, 2017.
(Continued)

*Primary Examiner* — Vivian C Chin
*Assistant Examiner* — Douglas J Suthers
(74) *Attorney, Agent, or Firm* — Anova Law Group, PLLC

(57) ABSTRACT

An unmanned aerial vehicle (UAV) with audio filtering components includes a background noise-producing component, a background microphone, and a noise emitter. The background noise-producing component is configured to produce a background noise. The background microphone is positioned within a proximity sufficiently close to collect interfering noise from the background noise producing component. The background microphone is configured to collect audio data including the background noise. The noise emitter is disposed within a proximity sufficiently close to the background noise-producing component to reduce the interfering noise. The noise emitter is configured to emit an audio
(Continued)

signal having a reverse phase of the audio data collected by the background microphone.

23 Claims, 11 Drawing Sheets

Related U.S. Application Data continuation of application No. PCT/CN2014/085619, filed on Aug. 29, 2014.

(51) Int. Cl.
*H04R 3/00* (2006.01)
*G10L 21/0216* (2013.01)
*G10L 21/0208* (2013.01)

(52) U.S. Cl.
CPC .. *B64C 2201/024* (2013.01); *B64C 2201/027* (2013.01); *B64C 2201/108* (2013.01); *B64C 2201/123* (2013.01); *B64C 2201/127* (2013.01); *B64C 2220/00* (2013.01); *G10L 21/0208* (2013.01); *G10L 2021/02165* (2013.01); *H04R 2410/05* (2013.01); *H04R 2410/07* (2013.01); *H04R 2430/20* (2013.01); *H04R 2460/01* (2013.01)

(58) Field of Classification Search
CPC ........ B64C 2201/108; B64C 2201/127; B64C 2220/00; G10K 11/1784; G10K 11/1782; G10K 2210/121; G10K 2210/1281; G10K 2210/3012; G10K 11/004; H04R 3/005; H04R 2410/05; H04R 2410/07; H04R 2430/20; H04R 1/1083; H04R 2460/01; G10L 2021/02165; G10L 21/0208
USPC .................... 381/71.8, 94.7, 71.12
See application file for complete search history.

(56) References Cited

U.S. PATENT DOCUMENTS

| | | | |
|---|---|---|---|
| 7,379,017 B2 | 5/2008 | Dwelly et al. | |
| 8,116,482 B2 | 2/2012 | Cerwin et al. | |
| 2004/0066940 A1* | 4/2004 | Amir | G10K 11/178 381/94.2 |
| 2005/0271221 A1 | 12/2005 | Cerwin | |
| 2007/0200027 A1* | 8/2007 | Johnson | B64C 39/022 244/3.1 |
| 2008/0007928 A1 | 1/2008 | Salama et al. | |
| 2010/0305782 A1 | 12/2010 | Linden et al. | |
| 2011/0042509 A1 | 2/2011 | Bevirt et al. | |
| 2011/0054891 A1 | 3/2011 | Vitte et al. | |
| 2012/0106753 A1 | 5/2012 | Theverapperuma et al. | |
| 2012/0154610 A1* | 6/2012 | Rahbar | H04R 3/005 348/207.99 |
| 2012/0292430 A1* | 11/2012 | Ferrari | B64D 1/22 244/2 |
| 2014/0138477 A1 | 5/2014 | Keennon et al. | |

FOREIGN PATENT DOCUMENTS

| | | |
|---|---|---|
| CN | 101231846 A | 7/2008 |
| CN | 101316478 A | 12/2008 |
| CN | 201177964 Y | 1/2009 |
| CN | 201604796 U | 10/2010 |
| CN | 201967020 U | 9/2011 |
| CN | 102651215 A | 8/2012 |
| CN | 103557043 A | 2/2014 |
| CN | 103886189 A | 6/2014 |
| CN | 103930791 A | 7/2014 |
| JP | H02147978 A | 6/1990 |
| JP | H05142335 A | 6/1993 |
| JP | 2000241534 A | 9/2000 |
| JP | 2003344083 A | 12/2003 |
| JP | 2013068434 A | 4/2013 |
| WO | 0131972 A1 | 5/2001 |

OTHER PUBLICATIONS

Klapel.J. Acoustic Measurements with a Quadcopter Embedded System Implementations for Recording audio from Above. Master's thesis, Institutt for elektronikk og telekommunikasjon, 2014.

Furukawa, et al. Noise correlation matrix estimation for improving sound source localization by multirotor UAV. Intelligent Robots and Systems (IROS), 2013 IEEE/RSJ International Conference on. IEEE, 2013.

Okutani, et al. Outdoor auditory scene analysis using a moving microphone array embedded in a quadrocopter Intelligent Robots and Systems (IROS), 2012 IEEE/RSJ International Conference on. IEEE, 2012.

The World Intellectual Property Organization (WIPO) International Search Report and Written Opinion for PCT/CN2014/085619 dated May 29, 2015.

DJI Phantom history/ model overview, posted by JOGI on Jan. 29, 2014, Drones Knowledge, Drone News, Entry-Level Drones, New Drone Models. English machine translation included. https://www.drohnen.de/1156/vergleich-kaugberatung-dji-phantom-phantom-fc40-phantom-2-phantom-2-vision/.

\* cited by examiner

UNMANNED AERIAL VEHICLE (UAV) FOR COLLECTING AUDIO DATA

CROSS-REFERENCE

This application is a continuation application of U.S. application Ser. No. 14/796,717, filed on Jul. 10, 2015, which is a continuation of International Application No. PCT/CN2014/085619, filed on Aug. 29, 2014. The above-referenced applications are hereby incorporated by reference in their entirety.

BACKGROUND OF THE DISCLOSURE

Aerial vehicles, such as unmanned aerial vehicles (UAVs), can be used for performing surveillance, reconnaissance, and exploration tasks for military and civilian applications. Such aerial vehicles may carry a payload (e.g., cameras, sensors or microphones) configured to perform a specific function.

In some instances, such as film shooting or surveillance, it may be desirable for aerial vehicles to collect and record audio data of a target of interest. However, background noise may interfere with the audio data of the target. The background noise may be produced by the aerial vehicles in flight that are collecting the audio data.

SUMMARY OF THE DISCLOSURE

In some instances, it may be desirable for an aerial vehicle, such as an unmanned aerial vehicle (UAV), to capture and/or record audio data. However, background noise produced by the UAV in flight may interfere with the target audio. Thus, in order to collect and/or record the target audio data, a need exists for cancelling or reducing the effects of the background noise on the audio data collected by the UAV. The present disclosure provides systems and methods related to cancelling background noise from audio data collected by the UAV. The UAV may be provided with one or more background microphones in a proximity of one or more background noise-producing components, such as propellers or rotors of the UAV. The noise produced by the propellers may be collected by the background microphones. The UAV may also comprise an audio source collecting microphone to collect the target audio data. The audio data from the background microphones may be used to reduce or cancel interfering background noise from the audio signal detected by the audio source collecting microphone using a Multi-Channel Recursive Least Square (RLS) adaptive filter, such that the target audio may be captured or recorded with little or no background noise.

Systems and methods may also be provided to reduce the background noise generated by the UAV itself. The UAV may be provided with one or more background microphones configured to collect background noise generated by the background noise-producing components, such as propellers or rotors of the UAV. The UAV may comprise noise emitters configured to emit a sound wave that provides a noise-canceling effect on the background noise generated by the background noise-producing components. The sound wave may optionally have the same amplitude but inverted phase to the collected background noise. In other instances, the sound wave may be generated using a multi-channel adaptive noise cancellation method, such as those described elsewhere herein. The acoustic waves combine and cancel each other out, thus at least at the audio source collecting microphone, the background noise may be cancelled and only the target audio may be captured and recorded.

An aspect of the disclosure may include an unmanned aerial vehicle (UAV) with audio filtering components, said UAV comprising: at least one audio source collecting microphone configured to detect a target audio signal; at least one background noise-producing component, wherein said background noise-producing component is configured to produce background noise that is different from the target audio signal; at least one background microphone positioned within a proximity sufficiently close to collect interfering noise from the background noise-producing component; and at least one processor configured to (a) receive signals indicative of (1) audio data collected by the at least one audio source collecting microphone and (2) audio data collected by the at least one background microphone, and (b) generate a processed signal based on the received signals, wherein the audio data collected by the at least one background microphone is used to reduce the background noise from the audio data collected by the at least one audio source collecting microphone to generate the processed signal.

In some embodiments, the proximity of the at least one background microphone to the background noise-producing component may be a predetermined distance of the background noise-producing component. In some cases, the predetermined distance may be 3 cm. In other cases, the predetermined distance may be less than a distance between the audio source collecting microphone and the background noise-producing component.

In some instances, the UAV may be a multi-rotor craft comprising a plurality of vertically oriented rotors. In some cases, the background noise-producing component may be a propulsion unit of the UAV. The propulsion unit of the UAV may comprise a rotor of the UAV. The background microphone may be positioned beneath the rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

The target audio signal may be generated from a source external to the UAV. The source may be beneath the UAV when the UAV being in flight. The audio source collecting microphone may be configured to collect audio data from sources at a greater distance than the background microphone. The audio source collecting microphone may have a greater sensitivity than the background microphone.

The UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor. The processed signal may be generated in real-time while the UAV being in flight. The processed signal may be generated using a Multi-Channel Recursive Least Square (RLS) adaptive filter to reduce the effects of the background noise.

Aspects of the disclosure may further include a method of collecting audio data using an unmanned aerial vehicle (UAV), said method comprising: collecting audio data that comprises a target audio signal, using an audio source collecting microphone on the UAV; collecting audio data using at least one background microphone on the UAV, said at least one background microphone positioned within a predetermined distance of at least one background noise-producing component, wherein said background noise-producing component is configured to produce background noise that is different from the target audio signal; and generating, with aid of at least one processor, a processed signal based on (1) the audio data collected by the at least one audio source collecting microphone and (2) the audio data collected by the at least one background microphone, wherein the audio data collected by the at least one background microphone is used to reduce the background noise from the audio data collected by the at least one audio source collecting microphone to generate the processed signal.

In some embodiments, the proximity of the at least one background microphone to the background noise-producing component may be a predetermined distance of the background noise-producing component. In some cases, the predetermined distance may be 3 cm. In other cases, the predetermined distance may be less than a distance between the audio source collecting microphone and the background noise-producing component.

In some instances, the UAV may be a multi-rotor craft comprising a plurality of vertically oriented rotors. The background noise-producing component may be a propulsion unit of the UAV. In some cases, the propulsion unit of the UAV may comprise a rotor of the UAV. The background microphone may be positioned beneath the rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

The target audio signal may be generated from a source external to the UAV. The source may be beneath the UAV when the UAV being in flight. In some instances, the audio source collecting microphone may be configured to collect audio data from sources at a greater distance than the background microphone. The audio source collecting microphone may have a greater sensitivity than the background microphone.

The UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor. The processed signal may be generated in real-time while the UAV being in flight. The processed signal may be generated using a Multi-Channel Recursive Least Square (RLS) adaptive filter to reduce the effects of the background noise.

A method of providing an unmanned aerial vehicle (UAV) to collect audio data may be provided in accordance with another aspect of the disclosure. The method comprises: providing at least one audio source collecting microphone on the UAV, wherein said audio source collecting microphone is configured to detect a target audio signal; identifying at least one background noise-producing component of the UAV, wherein said background noise-producing component is configured to produce background noise that is different from the target audio signal; attaching at least one background microphone on the UAV within a proximity sufficiently close to collect interfering noise from the at least one background noise-producing component; and providing at least one processor configured to (a) receive signals indicative of (1) audio data collected by the at least one audio source collecting microphone and (2) audio data collected by the at least one background microphone, and (b) generate a processed signal based on the received signals.

In some embodiments, the proximity of the at least one background microphone to the background noise-producing component may be a predetermined distance of the background noise-producing component. The predetermined distance may be 3 cm. The predetermined distance may less than a distance between the audio source collecting microphone and the background noise-producing component.

In some instances, the UAV may be a multi-rotor craft may comprise a plurality of vertically oriented rotors. In some cases, the background noise-producing component may be a propulsion unit of the UAV. The propulsion unit of the UAV may comprise a rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

The target audio signal may be generated from a source external to the UAV. The source may be beneath the UAV when the UAV being in flight. The audio source collecting microphone may be configured to collect audio data from sources at a greater distance than the background microphone. The audio source collecting microphone may have a greater sensitivity than the background microphone.

In some instances, the UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor.

The audio data collected by the at least one background microphone may be used to reduce the background noise from the audio data collected by the at least one audio source collecting microphone to generate the processed signal. The processed signal may be generated using a Multi-Channel Recursive Least Square (RLS) adaptive filter to reduce the effects of the background noise. The processed signal may be generated in real-time while the UAV being in flight.

In another embodiment, the disclosure may include an unmanned aerial vehicle (UAV) with audio filtering components, said UAV comprising: at least one background noise-producing component, wherein said background noise-producing component is configured to produce background noise; at least one background microphone positioned within a proximity sufficiently close to collect interfering noise from the background noise-producing component, said at least one background microphone configured to collect audio data including the background noise; and at least one noise emitter disposed within a proximity of the background noise-producing component, wherein the noise emitter is configured to emit an audio signal having a reverse phase of the audio data collected by the at least one background microphone, and wherein the proximity is sufficiently close to the background noise-producing component to reduce the interfering noise.

In some instances, the UAV may comprise at least one processor configured to (a) receive a signal indicative of audio data collected by the at least one background microphone, and (b) generate the audio signal emitted by the at least one noise emitter based on the received signals. The UAV may comprise at least one audio source collecting microphone configured to detect a target audio signal. The at least one processor may be configured to receive a signal indicative of audio data collected by the audio source collecting microphone including the target audio signal. The audio data collected by the at least one background microphone may be used to reduce the background noise from the audio data collected by the at least one audio source collecting microphone to generate the processed signal. The audio signal emitted by the noise emitter has substantially the same amplitude as the audio data collected by the at least one background microphone. The noise emitter may be a speaker.

In some cases, the proximity of the background microphone may be a predetermined distance of the background noise-producing component. The predetermined distance may be 3 cm. The predetermined distance may be less than a distance between the audio source collecting microphone and the background noise-producing component. The proximity of the noise-emitter may be a predetermined distance from the background noise-producing component. The predetermined proximity of the noise emitter to the noise-producing component may be a lesser distance than the predetermined distance of the background microphone to the noise-producing component.

In some embodiments, the UAV may be a multi-rotor craft comprising a plurality of vertically oriented rotors. In some cases, the background noise-producing component may be a propulsion unit of the UAV. The propulsion unit of the UAV comprises a rotor of the UAV. The background microphone may be positioned beneath the rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

In some instances, the target audio signal may be generated from a source external to the UAV. The source may be beneath the UAV when the UAV being in flight. The audio source collecting microphone may be configured to collect audio data from sources at a greater distance than the background microphone. The audio source collecting microphone may have a greater sensitivity than the background microphone.

The UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor.

A method of collecting audio data using an unmanned aerial vehicle (UAV) may be provided in accordance with another aspect of the disclosure, the method comprising: collecting audio data using at least one background microphone on the UAV, said at least one background microphone positioned within a proximity sufficiently close to collect interfering noise from at least one background noise-producing component, wherein said background noise-producing component is configured to produce background noise that is different from the target audio signal; and emitting an audio signal, using at least one noise emitter on the UAV disposed within a proximity of the background noise-producing component, wherein the audio signal has a reverse phase of the audio data collected by the at least one background microphone, and wherein the proximity may be sufficiently close to the background noise-producing component to reduce the interfering noise.

In some instances, the UAV may comprise at least one processor configured to (a) receive a signal indicative of audio data collected by the at least one background microphone, and (b) generate the audio signal emitted by the at least one noise emitter based on the received signals. The UAV may comprise at least one audio source collecting microphone configured to detect a target audio signal. The at least one processor may be configured to receive a signal indicative of audio data collected by the audio source collecting microphone including the target audio signal. The audio data collected by the at least one background microphone may be used to reduce the background noise from the audio data collected by the at least one audio source collecting microphone to generate the processed signal. The audio signal emitted by the noise emitter has substantially the same amplitude as the audio data collected by the at least one background microphone. The noise emitter may be a speaker.

In some cases, the proximity of the background microphone may be a predetermined distance of the background noise-producing component. The predetermined distance may be 3 cm. The predetermined distance may be less than a distance between the audio source collecting microphone and the background noise-producing component. The proximity of the noise-emitter may be a predetermined distance from the background noise-producing component. The predetermined proximity of the noise emitter to the noise-producing component may be a lesser distance than the predetermined distance of the background microphone to the noise-producing component.

In some embodiments, the UAV may be a multi-rotor craft comprising a plurality of vertically oriented rotors. In some cases, the background noise-producing component may be a propulsion unit of the UAV. The propulsion unit of the UAV comprises a rotor of the UAV. The background microphone may be positioned beneath the rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

In some instances, the target audio signal may be generated from a source external to the UAV. The source may be beneath the UAV when the UAV being in flight. The audio source collecting microphone may be configured to collect audio data from sources at a greater distance than the background microphone. The audio source collecting microphone may have a greater sensitivity than the background microphone.

The UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor.

Aspects of the disclosure may further include a method of providing an unmanned aerial vehicle (UAV) to collect audio data, said method comprising: identifying at least one background noise-producing component of the UAV, wherein said background noise-producing component is configured to produce background noise that is different from a target audio signal; attaching at least one background microphone on the UAV within a proximity sufficiently close to collect interfering noise from the at least one background noise-producing component; and attaching at least one noise emitter within a proximity of the background noise-producing component, wherein the noise emitter is configured to emit an audio signal generated based on the audio data collected by the at least one background microphone, and wherein the proximity is sufficiently close to the background noise-producing component to reduce the interfering noise.

In some instances, the UAV may comprise at least one processor configured to (a) receive a signal indicative of audio data collected by the at least one background microphone, and (b) generate the audio signal emitted by the at least one noise emitter based on the received signals. The UAV may comprise at least one audio source collecting microphone configured to detect a target audio signal. The at least one processor may be configured to receive a signal indicative of audio data collected by the audio source collecting microphone including the target audio signal. The audio data collected by the at least one background microphone may be used to reduce the background noise from the audio data collected by the at least one audio source collecting microphone to generate the processed signal. The audio signal emitted by the noise emitter may have substantially the same amplitude as the audio data collected by the at least one background microphone. The noise emitter may be a speaker. The noise emitter may be attached to an external surface of the UAV.

In some cases, the proximity of the background microphone may be a predetermined distance of the background noise-producing component. The predetermined distance may be 3 cm. The predetermined distance may be less than a distance between the audio source collecting microphone and the background noise-producing component. The proximity of the noise-emitter may be a predetermined distance from the background noise-producing component. The predetermined proximity of the noise emitter to the noise-producing component may be a lesser distance than the predetermined distance of the background microphone to the noise-producing component.

In some embodiments, the UAV may be a multi-rotor craft comprising a plurality of vertically oriented rotors. In some cases, the background noise-producing component may be a propulsion unit of the UAV. The propulsion unit of the UAV comprises a rotor of the UAV. The background microphone may be positioned beneath the rotor of the UAV. In other cases, the background noise-producing component may be a camera carried by the UAV. In other cases, the background noise-producing component may be a carrier configured to support a camera carried by the UAV and permit variation in orientation of the camera relative to the UAV.

In some instances, the target audio signal may be generated from a source external to the UAV. The source may be beneath the UAV when the UAV being in flight. The audio source collecting microphone may be configured to collect audio data from sources at a greater distance than the background microphone. The audio source collecting microphone may have a greater sensitivity than the background microphone.

The UAV may comprise a plurality of background noise-producing components and a plurality of background microphones, wherein at least one background microphones may be positioned within a predetermined distance of each of the background noise-producing components of said plurality. The UAV may comprise a plurality of rotors, and each rotor of said plurality may have at least one background microphone positioned within 3 cm of said rotor.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

The systems and methods described herein provide an effective approach to reduce or cancel background noise from audio data collected by an unmanned aerial vehicle (UAV). In some instances, it may be desirable for an aerial vehicle, such as a UAV to capture and/or record audio from a target of interest, for instance in film shooting. The target audio, however, may be competing with interfering background noise which may be produced by a background noise-generating component of the UAV. For example, propellers, rotors, cameras and/or carriers of the UAV may be the background noise-generating components. The UAV may be provided with at least one audio source collecting microphone to detect a target audio signal, and at least one background microphone to collect background noise produced by, for example, the propellers of UAV or other background noise-generating components. The collected background noise may be cancelled from the audio signal detected by the audio source collecting microphone using a Multi-Channel RLS adaptive filter, thus only the desired target audio signal remains for recording.

Systems and methods may also be provided for reducing the noise generated by the UAV itself using an ANC (Active Noise Cancellation) technique. The UAV of present disclosure may be provided with background microphones configured to collect background noise produced by, for example, the propellers of UAV. The UAV may also be provided with active noise cancellers. The active noise canceller may be a noise-cancellation speaker, which emits a sound wave. In some embodiments, the sound wave has the same amplitude but inverted phase to the collected background noise. Optionally, the sound wave may utilize any type of multi-channel adaptive noise cancellation method. The acoustic waves may combine to effectively cancel each other out at least at an audio source collecting microphone. Thus, the background noise may be cancelled, and only the desired target audio signal may be collected when the UAV is in flight.

Figure 1:
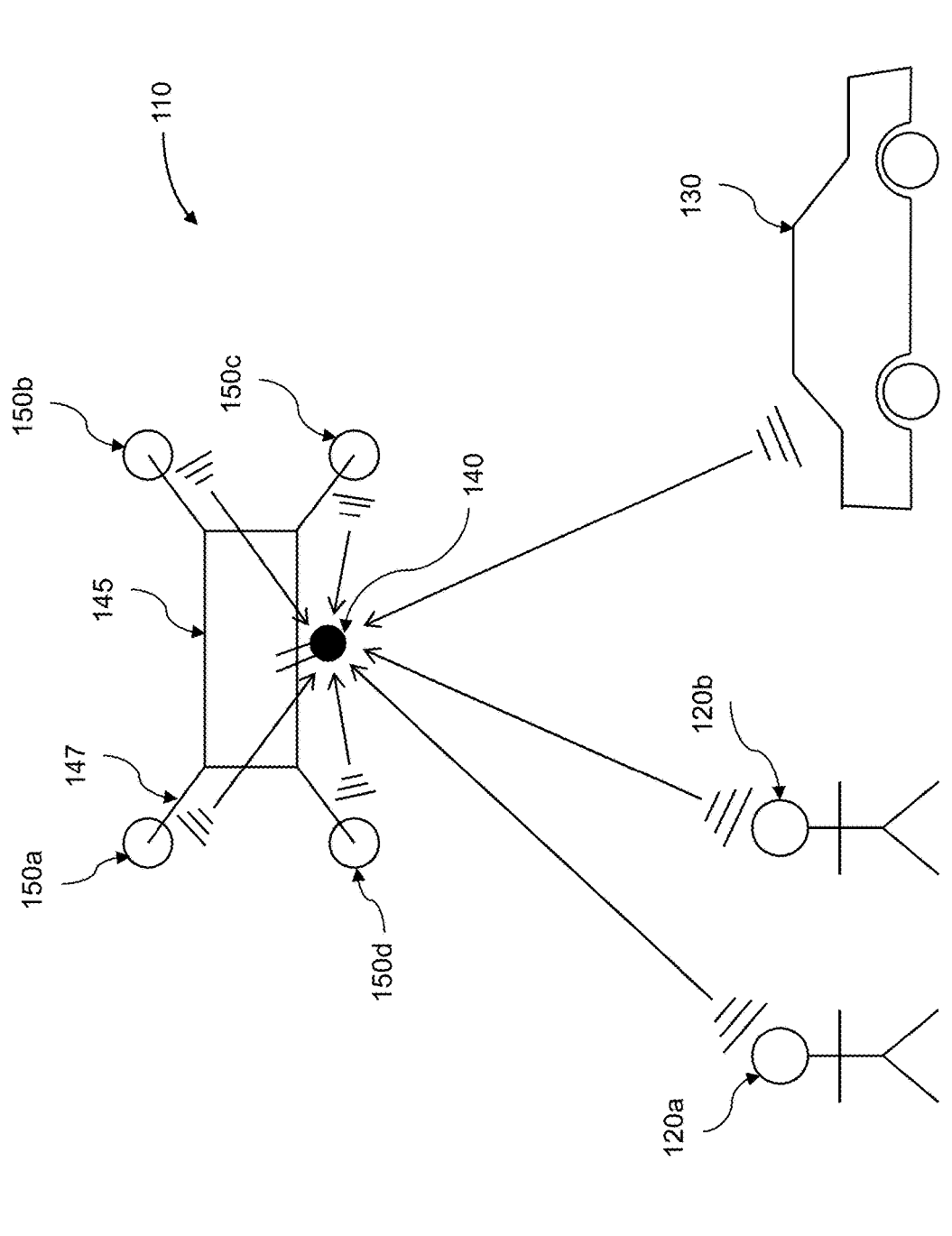
FIG. 1 shows an example of an unmanned aerial vehicle (UAV) that is used to collect audio signal from targets in accordance with an embodiment of the disclosure.

FIG. 1 shows an example of an unmanned aerial vehicle (UAV) 110 that is used to collect audio signal from targets 120a, 120b, 130 in accordance with an embodiment of the disclosure. Audio signals may be emitted by the targets and may be collected by an audio source collecting microphone 140. Optionally, the audio source collecting microphone 140 may be supported on a body 145 of the UAV. One or more background noise-producing components 150a, 150b, 150c, 150d may be provided. The background noise producing components may be on-board the UAV. The background noise producing components may generate a background noise that may be collected by the audio source collecting microphone.

Any description herein of a UAV 110 may apply to any type of movable object, such as an aerial vehicle. The description of a UAV may apply to any type of unmanned movable object (e.g., which may traverse the air, land, water, or space). The UAV may be capable of responding to commands from a remote controller. The remote controller may be not connected to the UAV. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously.

The UAV 110 may be an aerial vehicle. The UAV 110 may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 110 may be a rotorcraft. In some instances, the UAV 110 may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation being parallel to one another. In some instances, the rotors may have axes of rotation that are at any angle relative to one another, which may affect the motion of the UAV. The rotation of the rotors may be driven by one or more motors coupled to the rotors. The actuation of the motors and/or rotation of the rotors may cause background noise to be generated. The propulsion units, which may include the rotors and/or motors, may be background noise-generating components 150a, 150b, 150c, 150d on-board the UAV.

The UAV 110 may be of small dimensions. The UAV may be capable of being lifted and/or carried by a human. The UAV may be capable of being carried by a human in one hand.

The UAV 110 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 110 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 h, 80 h, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV 110 may have a body 145. In some instances, the body 145 may be a central body which may have one or more branching members 147, or "arms." The arms may extend outward from the body in a radial manner and be joined via the body. The number of arms may match the number of propulsion units, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units 150a, 150b, 150c, 150d of the UAV.

A battery may be coupled to the UAV 110. The battery may be coupled to a UAV to provide power to one or more components of the UAV. The battery provide power to one or more propulsion units, flight controller, sensor, inertial measurement unit, communication unit, and/or any other component of the UAV while coupled to the UAV. The battery may not provide power to any components of the UAV when decoupled from the UAV. For instance, the battery may not provide power to one or more propulsion units, flight controller, sensor, inertial measurement unit, communication unit, and/or any other component of the UAV while decoupled from the UAV. Examples of sensors of the UAV may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lisdar, time-of-flight cameras), inertial sensors (e.g., accelerometers, gyroscopes, inertial measurement units (IMUs)), altitude sensors, pressure sensors (e.g., barometers), audio sensors (e.g., microphones), or field sensors (e.g., magnetometers, electromagnetic sensors). The UAV may include one or more audio sensors to collect the target audio and/or background noise. In some instances, at least one audio sensor, such as an audio source collecting microphone, may be provided to detect the target audio. At least one audio sensor, such as a background microphone, may be provided to collect background noise. Any description herein of a microphone may apply to any type of audio or acoustic sensors.

The microphones 140 for collecting target audio and/or microphones for collecting background noise may be installed outside of the UAV body. Optionally, the microphones may be installed inside of the UAV body. Examples of types of microphone may include, but are not limited to, condenser microphone (e.g., electret condenser microphone), electret microphone, parabolic microphone, dynamic microphone, ribbon microphone, carbon microphone, piezoelectric microphone, fiber optic microphone, laser microphone, liquid microphone, or MEMS microphone. The audio source collecting microphone and/or the background microphone may be the same type of microphone or may be different types of microphones.

The directionality (or polar pattern) of the microphones may include, but are not limited to, omnidirectional, bi-directional, subcardioid, cardioid, hypercardioid, supercardioid, or shotgun.

The responsive frequency range of the microphones as employed in the embodiments may at least cover the human audio spectrum of 20 Hz to 20 kHz. The lower limit of responsive frequency range of the microphones may be less than or equal to 5 Hz, 10 Hz, 20 Hz, 25 Hz, 30 Hz, 40 Hz, 50 Hz, 70 Hz, 80 Hz, 90 Hz, 100 Hz, 130 Hz, 150 Hz, 200 Hz, 500 Hz, 700 Hz, or 1 kHz. The upper limit of responsive frequency range of the microphones may be larger than or equal to 2 KHz, 2.5 kHz, 3 kHz, 3.1 kHZ, 3.15 kHz, 3.2 kHz, 3.5 kHz, 4 kHz, 6 kHz, 8 kHz, 10 kHz, 12 kHz, 14 kHz, 16 kHz, 18 kHz, 19 kHz, 20 kHz, 30 kHz, 40 kHz, 50 kHz, 70 kHz, 80 kHz, or 100 kHz. The microphones may have a lower limit of responsive frequency falling within a range between any two of the values described herein. The microphones may have an upper limit of responsive frequency falling within a range between any two of the values described herein.

The sound-receiving distance of the microphones for collecting target audio and/or microphones for collecting background noise may vary depending on the type and directionality. The sound-receiving distance of the microphones may be larger than or equal to 1 cm, 3 cm, 5 cm, 10 cm, 15 cm, 20 cm, 30 cm, 40 cm, 50 cm, 60 cm, 70 cm, 80 cm, 90 cm, 1 m, 1.5 m, 2 m, 2.5 m, 3 m, 3.5 m, 4 m, 4.5 m, 5 m, 5.5 m, 6 m, 6.5 m, 7 m, 7.5 m, 8 m, 8.5 m, 9 m, 9.5 m, 10 m, 10.5 m, 11 m, 11.5 m, 12 m, 12.5 m, 13 m, 13.5 m, 14 m, 14.5 m, 15 m, 15.5 m, 16 m, 16.5 m, 17 m, 17.5 m, 18 m, 18.5 m, 19 m, 19.5 m, 20 m, 23 m, 25 m, 27 m, 30 m, 35 m, 40 m, 45 m, 50 m, 55 m, 60 m, 65 m, 70 m, 75 m, 80 m, 85 m, 90 m, 95 m, or 100 m. The microphones may have a sound-receiving distance falling within a range between any two of the values described herein.

The microphones may use various ways to collect the target audio by producing an electrical signal from air pressure variation, including are but not limited to, electromagnetic induction (dynamic microphones), capacitance change (condenser microphones), or piezoelectricity (piezoelectric microphones).

Sensitivity of a microphone is an electrical output produced in a microphone in response to an input with a specified sound level. Sensitivity is expressed in decibels (dB, or dBV), the standard unit for indicating the ratio of power output to input, which is defined by public standards in individual countries. In some instances, the sensitivity of microphones for collecting target audio and/or microphones for collecting background noise may be larger than or equal to −90 dBV, −80 dBV, −70 dBV, −65 dBV, −60 dBV, −55 dBV, −50 dBV, −45 dBV, −42 dBV, −40 dBV, −38 dBV, −36 dBV, −34 dBV, −32 dBV, −30 dBV, −28 dBV, −26 dBV, −24 dBV, −22 dBV, −20 dBV, −18 dBV, −16 dBV, −14 dBV, or −10 dBV. The microphones may have a sensitivity falling within a range between any two of the values described herein.

The microphones for collecting target audio and/or microphones for collecting background noise may have a greatest dimension (e.g., length, width, height, diagonal, diameter) of no more than 100 cm. In some instances, the greatest dimension may be less than or equal to 1 mm, 3 mm, 5 mm, 7 mm, 1 cm, 1.5 cm, 2.0 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, 10 cm, 10.5 cm, 11 cm, 11.5 cm, 12 cm, 12.5 cm, 13 cm, 13.5 cm, 14 cm, 14.5 cm, 15 cm, 15.5 cm, 16 cm, 16.5 cm, 17 cm, 17.5 cm, 18 cm, 18.5 cm, 19 cm, 19.5 cm, 20 cm, 21 cm, 25 cm, 30 cm, 35 cm, 40 cm, 45 cm, 50 cm, 60 cm, 70 cm, 80 cm, 90 cm, or 100 cm. Optionally, the greatest dimension of the microphones may be greater than or equal to any of the values described herein. The microphones may have a greatest dimension falling within a range between any two of the values described herein.

The microphones for collecting target audio and/or microphones for collecting background noise may be lightweight. For example, the microphones may weigh less than or equal to 1 mg, 10 mg, 30 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 h, 80 h, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, or 5 kg. The microphones may have a weight greater than or equal to any of the values described herein. The microphones may have a weight falling within a range between any two of the values described herein.

As previously described, the source audio collecting microphone(s) and the background microphone(s) may be the same type of microphones or may be different types of microphones. The microphones may have the same or different characteristics, such as the characteristics described herein. Different microphones on-board the UAV may have their own individualized characteristics, or groups of microphones may have the same characteristics.

In one example, a source audio collecting microphone 140 may have a greater sensitive or noise-collecting range than a background microphone. In one example, the source collecting microphone may be configured to detect audio from targets 120a, 120b, 130 that may be some distance away from the UAV 110. The background microphones may be configured to detect audio from background noise-producing components on-board the UAV, so the distance range may not need to be as great. In another example, a source audio collecting microphone may be omnidirectional to pick up target audio from a wide area range, while the background microphones may be designed to pick up background from a particular direction if the background noise-producing components remain at a known position relative to the background microphones.

The UAVs 110 may fly in various environments for various purposes including target audio collecting. In some instances, the UAV may fly over an open territory and record the ambient audio. Optionally, the UAV may hover or circle a target 120a, 120b, 130 in an open space and collect the audio from this specific target. Optionally, the UAV may hover or circle a target in a closed space and collect the audio from this specific target. For example, in an indoor film shooting application, the UAV may hover overhead of the actors, relatively still. Optionally, in outdoor target monitoring application such as pet walking, in order to follow the target's movement and tracks, the UAV may dynamically alter its direction, speed and height.

The environment may be an indoor or outdoor environment. The environment may be a relatively clear environment with few obstructions. Alternatively, obstructions may be provided. The UAV may navigate around obstructions. In some instances, collision avoidance techniques may be employed by the UAV.

Examples of the targets 120a, 120b, 130 may include any moveable or still objects. Example of the targets may include, but are not limited to, humans 120a, 120b, animals, vehicles 130, aerial vehicles, machines, instruments or simply the ambient environment. The targets may or may not be living beings. The targets may be machines. In some instances, the target may be beneath the UAV while the UAV is in flight. Optionally, the target may be lateral to the UAV. In other instances, the target may be located above the UAV. The target may or may not move in height relative to the UAV. The target may remain at a stationary or changing height relative to an underlying surface of the environment, such as a ground or structure. The target may be in front of, directly in line with, behind, to the left of, or to the right of the UAV. The target may or may not move in lateral position relative to the UAV. The target may remain stationary or at a changing lateral position relative to an underlying surface of the environment. In some instances, movements of the target with respect to the UAV may be due to movements of the target relative to the environment, movements of the UAV relative to the environment, or both. A virtual line connecting the UAV and the target may form arbitrary angle with respect to the horizon, include but not limited to 90°, 85°, 80°, 75°, 70°, 65°, 60°, 55°, 50°, 45°, 40°, 35°, 30°, 25°, 20°, 15°, 10°, 5°, or 0°.

A distance from the UAV to the target may vary in different applications. In some instances such as indoor film shooting, the UAV carrying target audio collecting microphone may be away from the target by a distance more than or equal to 1 cm, 3 cm, 5 cm, 8 cm, 10 cm, 15 cm, 20 cm, 25 cm, 30 cm, 35 cm, 40 cm, 45 cm, 50 cm, 60 cm, 70 cm, 80 cm, 90 cm, 1 m, 1.3 m, 1.5 m, 1.8 m, 2 m, 2.5 m, 3 m, 3.5 m, 4 m, 4.5 m, or 5 m. Optionally, in other instances such as disaster rescue, the distance from the UAV to the target may be more than or equal to 0.5 m, 1 m, 2 m, 3 m, 4 m, 5 m, 6 m, 7 m, 8 m, 9 m, 10 m, 13 m, 15 m, 18 m, 20 m, 23 m, 25 m, 28 m, 30 m, 35 m, 40 m, 45 m, or 50 m.

In collecting the target audio, the audio signal arriving at the audio collecting microphone may comprise noise (interference audio), in addition to the target audio. The interfering noise may be the noise produced by UAV itself or ambient noise. For example, the rotors of a multi-rotor UAV may generate remarkable noise when the UAV is in operation. Optionally, the sound of wind may be a dominant noise source when the UAV is in flight. The noise from UAV may be generated from the UAV itself or any onboard instrument, including but not limited to, propulsion units, gimbal motors, or cameras. In order to collect and record the interested target audio, it may be desirable to cancel the background noise from the audio signal arriving at the audio source collecting microphone.

In some embodiments, a target 120a, 120b, 130 may be closer to an audio source collecting microphone 140 than a background noise producing component 150a, 150b, 150c, 150d. Alternatively, the background noise producing components may be closer to the audio source collecting microphone than the target. The target may produce more noise than the background noise producing components. Alternatively, the background noise producing components may produce more noise than the target.

Figure 2:
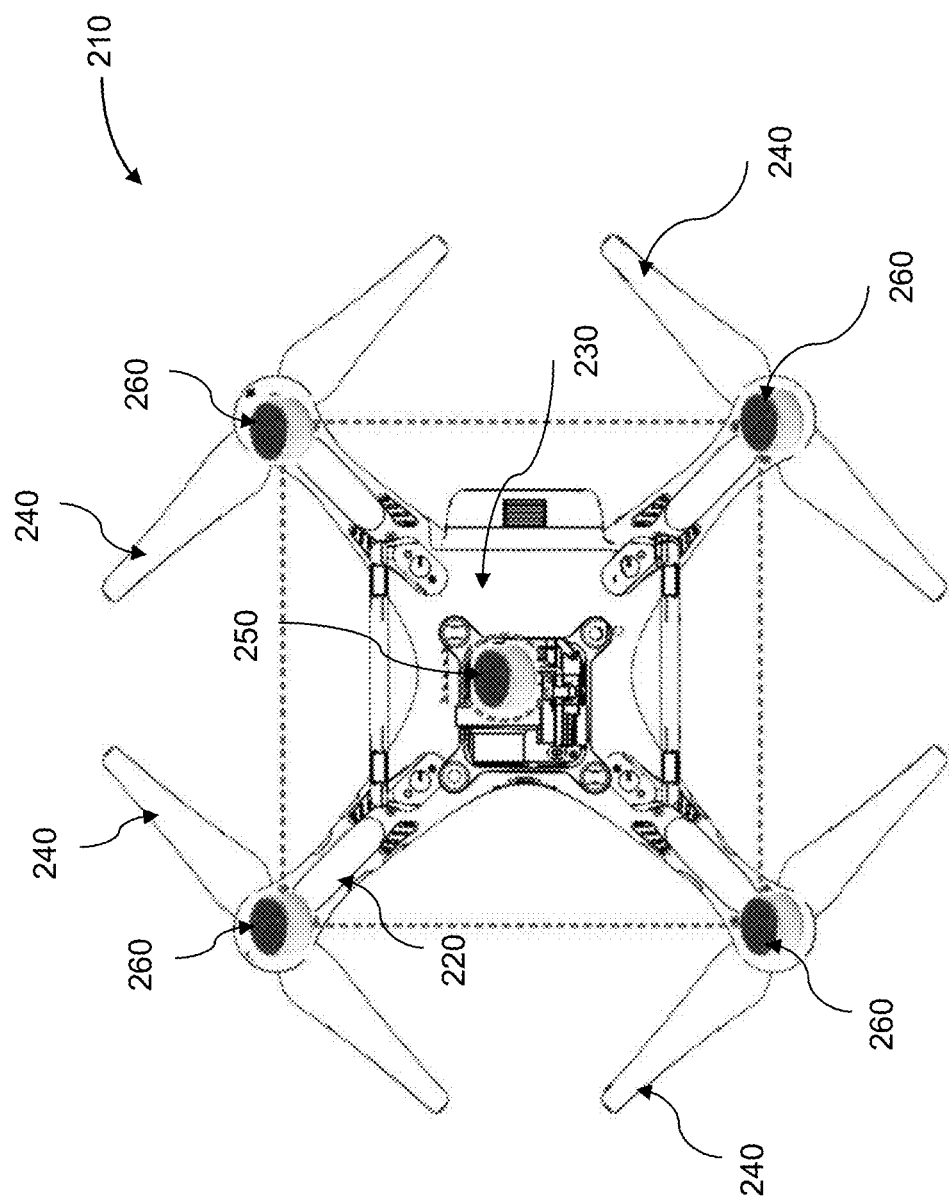
FIG. 2 shows an example of UAV that is equipped with an audio source collecting microphone and plural of background microphones in accordance with an embodiment of the disclosure.
Figure 3:
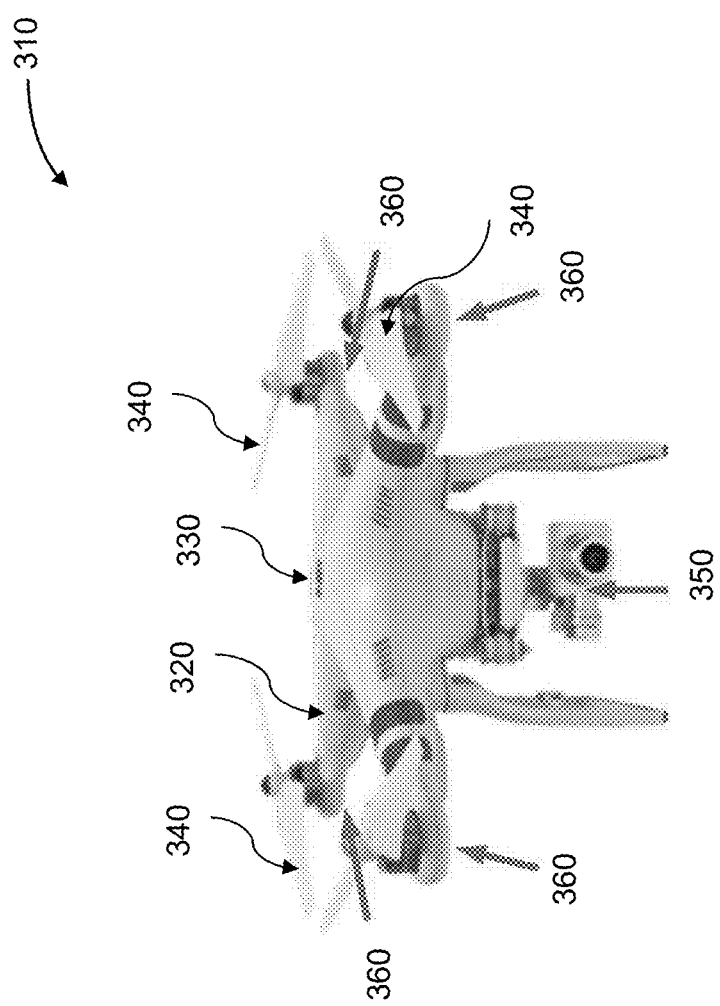
FIG. 3 shows a perspective view of an example of UAV that is equipped with an audio source collecting microphone and plural of background microphones in accordance with an embodiment of the disclosure.

FIG. 2 shows an example of UAV 210 that is equipped with an audio source collecting microphone 250 and plural of background microphones 260 in accordance with an embodiment of the disclosure. FIG. 3 shows a perspective view of an example of UAV 310 that is equipped with an audio source collecting microphone 350 and plural of background microphones 360 in accordance with an embodiment of the disclosure. The UAV 210 may have a central body 230 (not shown in FIG. 2) from which one or more arms 220 may extend. Any number of arms may be provided, such as one, two, three, four, five, six, seven, eight, nine, ten, or more arms. In some embodiments, each arm may have a propulsion unit on the arm. Alternatively, one or more arms may not have a propulsion unit on the arm. In one example, the UAV 210 may comprise four rotors 240 (a.k.a. propellers) which can be disposed at distal ends of the four arms 220. The four arms 220 may extend outward from the body 230 of UAV in a radial manner. The four arms and four rotors/propellers in this embodiment are only exemplary. In other embodiments, any number of arms may be employed, as long as the number of arms matching the number of propulsion units, or rotors/propellers, of the UAV. In addition, the UAV 210 may carry various payloads including but not limited to carriers, cameras, and sensors. The payloads may be carried on the central body of the UAV, the arms of the UAV, a landing stand of the UAV, or any other portion of the UAV. All these components may generate noise in operation.

A UAV may have one or more noise-producing component on-board the UAV. The noise-producing component may produce noise while the UAV is in operation. The noise-producing component may produce noise while the UAV is in flight. The noise-producing component may produce noise while the UAV is in motion. In some instances, a noise-producing component may interact with an environment in order to produce the noise (e.g., wind). A noise producing component may move to produce the noise. A noise producing component may be actuated or driven by an actuator to produce noise. The noise-producing component may include one or more electrically powered component that may generate the noise.

Examples of noise-producing components may include, but are not limited to, propulsion unit (e.g., rotors), motors, payload carriers, payloads, sensors, communication units, emitters (e.g., speakers), landing gear, or any other component on board the UAV. Noise-producing components may be an on external surface of the UAV housing, within a UAV housing, integrated into a UAV housing, or provided an extension extending away from the housing. In some instances, vibrations of the UAV may generate noise. Vibrations may occur due to actuation of one or more motors, or other component of the UAV.

A propulsion unit of a UAV 210 may generally comprise a rotor 240. The rotors 240 which may include rotor blades, can be respectively driven by one or more motors. The rotors 240 may rotate and generate lift for the UAV 210. The motors may be driven by the battery or battery assembly installed inside of the body of UAV. During the rotating of the rotors/propellers, remarkable noise may be generated and can propagate in all directions.

Cameras may be carried by the UAV in such applications as film shooting, site survey, or remote sensing. In the course of filming, the internal motors of the camera may continue to zoom and focus. Some cameras may beep in response to certain events or when performing certain functions. In some instances, cameras may include shutters that may provide noise. In such application as indoor film shooting, even this noise generated by the camera may not be desirable. Other types of payloads may be supported by a UAV. Other payloads may be capable of generating noise.

A carrier may be provided to support a payload. For example, a carrier for cameras on a UAV may be a gimbal-stabilized platform. The carrier may be generally equipped with a yaw motor, a roll motor and/or a pitch motor such that the gimbal may rotate about one, two, or three axes of rotation. The camera may be installed on a terminal or seat of the gimbal. By the actuation of the motors, the gimbal may independently adjust the yaw angle, roll angle and/or pitch angle of the camera. These motors may be either driven by the battery or battery assembly installed inside of the body of UAV, or by a dedicated battery of the gimbal. In the actuation of these motors, noise may be generated.

In an embodiment, as illustrated in FIG. 2, four background microphones 260 may be respectively disposed at distal ends of the arms 220 of UAV in accordance with four propulsion units, and one audio source collecting microphone 250 may be disposed at a center portion 230 of the UAV body 210. The background microphones 260 may collect background noise generated by the background noise-producing components (e.g., propulsion units). The audio source collecting microphone 250 may collect target audio, e.g., audio signal from interested people. Both the target audio and the background noise may arrive at the audio source collecting microphone 250, which means that the target audio may be interfered by the background noise.

In some embodiments, as shown in FIG. 3, background microphones 360 may be supported on arms 320 of the UAV beneath the propulsion units 340 or other types of background noise producing components. An audio source collecting microphone 350 may be located on or beneath a central body 330 of the UAV 310.

In some embodiments, an audio source collecting microphone 250, 350 may be disposed at a center portion of the UAV body 230, 330. In order to collect the target audio signal from the source, the audio source collecting microphone 250 may be installed beneath the UAV body 230. The audio source collecting microphone may be provided on an external surface of the UAV, within a housing of the UAV, integrated into the housing of the UAV, or on an extension extending away from the UAV. The audio source may collecting microphone may be on or near a central body of the UAV or on or near an arm or other extension of the UAV. In some instances, the audio source collecting microphone may be on an extension member, such as a landing stand, extending away from the UAV. This may advantageously distance the audio source collecting microphone from one or more noise-generating component on-board the UAV. In other instances, the audio source collecting microphone may not be so far away from the body of the UAV for aerodynamic or stabilization purposes. In another example, the audio source collecting microphone may be fixed on a seat of gimbal, or other type of carrier on-board the UAV. In another instance, the audio source collecting microphone may be attached to a payload of the UAV or may be a payload of the UAV. Optionally, the audio source collecting microphone 250 may be installed at arbitrary position on the UAV 210. For example, the audio source collecting microphone 250 may be either disposed inside of the UAV body, on upper surface of the UAV body, or on lateral surface of the UAV body, as long as the audio source collecting microphone 250 may collect target audio signal. In some instances, the audio source collecting microphone may be located on or near a surface that may aid in collecting the target audio signal. For example, a dish or parabolic receiver may aid in collecting audio signals.

In some embodiments, the audio source collecting microphone 250 may be provided as an independent component. Alternatively, in other embodiments, the audio source collecting microphone 250 may be provided as an integrated component of the UAV or any payload. For example, the audio source collecting microphone 250 may be integrated in the camera or in the gimbal, or the audio source collecting microphone 250 may be integrated in any internal sensor of the UAV.

In some embodiments, the audio source collecting microphone 250 may collect target audio signal from sources at a greater distance than the background microphones 260, due to the fact that the target may locate at larger distance than the noise producing components with respect to the UAV body. This may be achieved, for example, by configuring the audio source collecting microphone 250 having a greater sensitivity than the background microphone 260. For better audio collecting, for example, the audio source collecting microphone may be a unidirectional microphone, the polar pattern of which may be shotgun.

Any number of audio source collecting microphones may be provided. In some instances, a single audio source collecting microphone may be provided. Alternatively, multiple audio source collecting microphones may be supported by the UAV. Multiple audio source collecting microphones may be of the same type or may be of different types. Multiple audio source collecting microphones may all be at the same location on the UAV or may be on different locations of the UAV, such as any combination of location of the UAV described herein.

In some embodiments, a plurality of audio source collecting microphones may be adopted to form an audio source collecting array. By such an audio source collecting array, a directional collecting of the audio may be achieved by beam-forming technology with improved SNR (Signal to Noise Ratio) and better noise cancelling effect.

In order to precisely collect the background noise from the background noise-producing components, a background microphone 260 may be disposed in close proximity to the background noise-producing component 240. In some instances, the background microphone may be as close as possible to the background noise-producing component. In some embodiments, the background microphone 260 may be disposed directly on the background noise-producing component. For example, the background microphone may be disposed on an outer case of a propulsion unit of the UAV. In another example, the background microphone may be disposed on a motor. In an additional example, the background microphone may be disposed on the rotor blades. In an additional example, the background microphone may be disposed on the camera of the UAV. In an additional example, the background microphone may be disposed on the carrier of the UAV. In an additional example, the background microphone may be disposed on the motors (e.g., pitch motor, roll motor and yaw motor) of the gimbal of the UAV. The background microphone may be positioned directly beneath a propulsion unit. For instance, the background microphone may be positioned beneath a motor driving a rotor, and/or the rotor itself.

A background microphone may be positioned directly on a noise-producing component. The background microphone may be positioned on a housing partially or completely enclosing a noise-producing component. The background microphone may be positioned on top of the noise-producing component, on a side of the noise producing component, beneath the noise-producing component, on top of the housing, on a side of the housing, or beneath the housing. The background microphone may be positioned between the noise-producing component and an audio source collecting microphone. For example, if a line is provided between the noise-producing component and the audio source collecting microphone, the background microphone may be positioned on the line or substantially near the line, between the noise-producing component and the audio source collecting microphone.

The background microphone 260 may be disposed within a proximity of the noise-producing component 240 that is sufficiently close to collect interfering noise from the noise-producing component. The background microphone may be sufficiently close to the noise-producing component to better collect the interfering noise than the audio source collecting microphone 250. The background noise may be picked up with a greater amplitude using the background microphone, than using the audio source collecting microphone. The background noise may be picked up with greater clarity using the background microphone than using the audio source collecting microphone.

For instance, the background microphone 260 may be positioned within a predetermined distance of the background noise-producing component 240. For example, the background microphone 240 may be disposed within a predetermined distance of the propulsion unit of the UAV. In another example, the background microphone may be disposed within a predetermined distance of the motor. In an additional example, the background microphone may be disposed within a predetermined distance of the propeller/rotor blades. In an additional example, the background microphone may be disposed within a predetermined distance of the camera of the UAV. In an additional example, the background microphone may be disposed within a predetermined distance of the carrier of the UAV. In an additional example, the background microphone may be disposed within a predetermined distance of the motors (e.g., pitch motor, roll motor and yaw motor) of a gimbal of the UAV.

In some embodiments, the background microphone may be positioned at a distance that is closer to the noise-producing component than the audio source collecting microphone. The background microphone may be positioned at a predetermined distance that selected to be less than the distance between the noise-producing component and the audio source collecting microphone. In some embodiments, a relative position between the audio source collecting microphone and noise-producing component may be known. A predetermined distance may be selected for the background microphone that may be less than a known distance between the audio source collecting microphone and the noise-producing component.

In some embodiments, as illustrated in FIG. 2 and FIG. 3, four background microphones may be respectively disposed for four background noise-producing components (e.g., propellers) within a predetermined distance of each of the background noise-producing components. Alternatively, in some embodiments, for a UAV including a plurality of background noise-producing components, a plurality of background microphones may be provided and positioned within a predetermined distance of each of the background noise-producing components. A plurality of background noise-producing components of a UAV may include a plurality of propulsion units (e.g., rotor blades and/or motors). At least one, two or more of the plurality of propulsion units may have a background microphone within a predetermined distance. Optionally, each propulsion unit may have a background microphone within a predetermined distance. Each propulsion unit may have its own dedicated background microphone. Alternatively, one or more propulsion units may share a background microphone.

In some embodiments, the predetermined distance between the background microphone and the background noise-producing component may be less than or equal to 1 mm, 3 mm, 5 mm, 7 mm, 1 cm, 1.5 cm, 2 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, or 10 cm. The predetermined distance may fall within a range between any two of the values described herein.

In some embodiments, the predetermined distance is less than a distance between the audio source collecting microphone and the background noise-producing components. The predetermined distance may be less than 25% or 50% of the distance between the audio source collecting microphone and the background noise-producing component.

In some embodiments, the background microphone 260 is disposed beneath the rotor 240. In alternative embodiments, the background microphone 260 is disposed beneath the propeller 250. In alternative embodiments, the background microphone 260 is disposed adjacent to the rotor 240 or propeller 250.

The background microphones 240 may be omnidirectional, that is to say, it may receive audio signals equally in any direction. Optionally, the background microphones 240 may be unidirectional, that is to say, it is sensitive to audio signals from only one direction. In case of unidirectional background microphones, the background microphone may be orientated to the background noise-producing component.

In the explanatory embodiments of FIG. 2 and FIG. 3, four background microphones may be provided in accordance with four propulsion units. However, the number of background microphones is not thus limited. At least one background microphone may be deployed, as long as the background noise may be collected. In some embodiments, the number of background microphones may be less than or equal to the number of background noise-producing components. For example, for a four-rotor UAV, four, three, two or one background microphone may be disposed to collect the background noise. Alternatively, the number of background microphones may not be less than the number of background noise-producing components. For example, for a four-rotor UAV, four, five, six, seven, eight, or more microphones may be disposed to collect background noise. One, two, or more background microphones may be disposed to collect audio data from each noise-producing component, such as each propulsion unit.

In the explanatory embodiments of FIG. 2 and FIG. 3, one audio source collecting microphone may be installed for collecting target audio. However, the number of audio source collecting microphones is not limited to one, but at least one audio source collecting microphone may be deployed. In some embodiments, for a four-rotor UAV, two, three, or more audio source collecting microphones may be disposed to detect the target audio.

The background noise may be different from the target audio in frequency and/or amplitude. In some embodiments, the target audio may be generated from a source external to the UAV. For example, the source may be beneath the UAV when the UAV is in flight. In some embodiments, the background noise may be produced by the UAV itself, e.g., by a propulsion unit comprising a propeller and a rotor. Optionally, the background noise may be produced by payloads carried by UAV, e.g., a camera, or a carrier configured to support a camera carried by the UAV and permit variation in orientation of the camera relative to the UAV (e.g., a gimbal). The background noise may be produced by any component or device on-board the UAV and/or which may travel with the UAV during flight. Optionally, the background noise may be generated by ambience such as the wind.

In some embodiments, the UAV may include plural types of background noise-producing components. For example, both the propulsion units and the carrier may be considered as background noise-producing components; in this case, a plurality of background microphones may be accordingly disposed for the propulsion units and the carrier, within a predetermined distance of each of the background noise-producing components. For example, four background microphones may be disposed for the four propulsion units, and another three background microphones may be disposed for the three motors of the carrier. Optionally, both the propulsion units and the camera may be considered as background noise-producing components; in this case, four background microphones may be disposed for the four propulsion units, and another one background microphone may be disposed for the camera.

Various background noise-producing components may be distributed anywhere on the UAV. In some instances, the background noise-producing components may be on an arm or extension of the UAV or a central body of the UAV. The background noise-producing components may be supported above a UAV on a side of a UAV, or beneath the UAV. The background noise-producing components may be external to a housing of the UAV, or within a housing of the UAV. Any combination of locations for various background components may be provided.

In some embodiments, at least one processor may be provided to cancel the background noise from the audio data collected by the audio source collecting microphone, and generate a processed signal (e.g., an audio signal in which background noise is removed or reduced from the collected audio signal). The processor may (a) receive signals indicative of (1) audio data collected by the at least one audio source collecting microphone and (2) audio data collected by the at least one background microphone, and (b) generate a processed signal based on the received signals, wherein the audio data collected by the at least one background microphone may be used to reduce the background noise from the audio data collected by the at least one audio source collecting microphone to generate the processed signal. The processed signal may be a purified audio signal of the target audio.

The processor may be provided as part of control circuit of the UAV, or, it can be provided as an independent circuit, module or chip. The processor may be implemented by Central Processing Unit (CPU), Application Specific Integrated Circuit (ASIC), or Field Programmable Gate Array (FPGA). Any description herein of a processor may apply to one or more processors, which may individually or collectively perform any functions described for the processor. The processor may be capable of executing one or more steps in accordance with non-transitory computer readable media comprising code, logic, or instructions for performing one or more steps. Memory storage units may be provided which may comprise the non-transitory computer readable media.

One or more processors may be provided on-board the UAV. The audio signals may be processed on-board the UAV. One or more processors may be provided off-board the UAV. The audio signals may be provided off-board the UAV. In some instances, an external device may be provided with the processor(s) that may process the audio signals. In some instances the external device may be a controller of the UAV. The controller of the UAV may control flight of the UAV, a sensor of the UAV, a carrier of the UAV, a payload of the UAV, or any other component of the UAV. In some other instances, the external device may be a display device and/or speaker. The external device may be a monitor, speaker, desktop computer, laptop computer, tablet, cell phone, smartphone, personal digital assistant, or any other device. In some instances, one or more processors may be distributed over the UAV and one or more external devices, or over a plurality of external devices. The processors that may be distributed over the UAV and/or devices may individually or collectively generate the processed signals.

In some embodiments, the processed signal may be generated in real-time while the UAV is in flight. A processed audio signal of a target may be generated within 0.01 seconds, 0.05 seconds, 0.1 seconds, 0.5 seconds, 1 second, 1.5 seconds, 2 seconds, 3 seconds, 5 seconds, 10 seconds, 20 seconds, 30 seconds, 1 minute, 2 minutes, or 5 minutes of the sound being emitted by the target. The processor may generate the processed signal using a variety of algorithms. One example of such an algorithm is a Multi-Channel Recursive Least Square (RLS) algorithm. In some embodiments, the processor may generate the processed signal using a Multi-Channel RLS adaptive filter to reduce the effects of the background noise. In other embodiments, other kinds of adaptive filters having similar configuration but less computation and less estimation error may be adopted.

Figure 4:
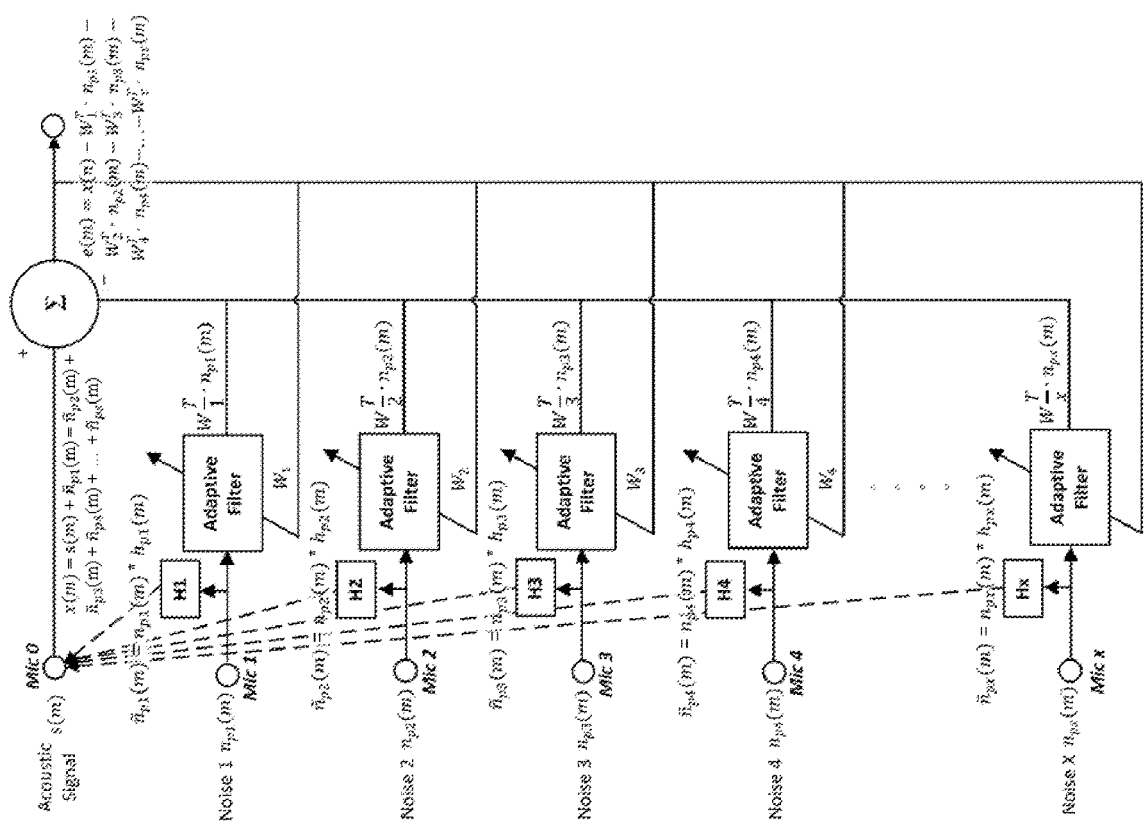
FIG. 4 shows a generic Multi-Channel RLS adaptive filter which is particularly suitable to reduce the effects of the background noise in UAVs of the disclosure.

FIG. 4 shows a generic Multi-Channel RLS adaptive filter which is particularly suitable to reduce the effects of the background noise in UAVs of the disclosure. The Multi-Channel RLS adaptive filter of FIG. 4 may be applied in a UAV with X rotors, which is provided with X background microphones and one audio source collecting microphone. In FIG. 4, the noise produced by the propellers may be considered as the background noise.

The processor may adopt an adaptive filtering method to cancel the background noise. The filter parameters at current timing may be automatically adjusted according to an estimation error, by using the filter parameters at previous timing. The optimal filtering may be achieved by keeping a specific "cost function" minimum.

Any description herein of propeller noise may apply to noise from any other noise-producing components, such as those described elsewhere.

As shown in FIG. 4, the noise produced by X propellers may be collected by background microphones MIC 1 to MIC x as, $n_{p1}(m)$, $n_{p2}(m)$, $n_{p3}(m)$, $n_{p4}(m)$, ... $n_{px}(m)$, respectively. The noise produced by the propellers may propagate and arrive at the target audio collecting microphone. The propeller noise arriving at the target audio collecting microphone may be defined as $ñ_{p1}(m)$, $ñ_{p2}(m)$, $ñ_{p3}(m)$, $ñ_{p4}(m)$, ..., $ñ_{px}(m)$ respectively, which may be equivalent to a convolution with a transfer function $h_{px}(m)$:

$$ñ_{p1}(m) = n_{p1}(m) * h_{p1}(m)$$

$$ñ_{p2}(m) = n_{p2}(m) * h_{p2}(m)$$

$$ñ_{p3}(m) = n_{p3}(m) * h_{p3}(m)$$

$$ñ_{p4}(m) = n_{p4}(m) * h_{p4}(m)$$

...

$$ñ_{px}(m) = n_{px}(m) * h_{px}(m)$$

The signal input into the target audio collecting microphone MIC 0 may be defined as:

$$x(m)=s(m)+ñ_{p1}(m)+ñ_{p2}(m)+ñ_{p3}(m)+ñ_{p4}(m)+ \ldots +ñ_{px}(m)$$

Wherein s(m) may be the target voice signal collected by the target audio collecting microphone MIC 0, $ñ_{p1}(m)$ to $ñ_{px}(m)$ may be the propeller interference signal mixed into the target audio collecting microphone, and s(m) may be irrelevant to $ñ_{p1}(m)$ to $ñ_{px}(m)$.

As shown in FIG. 4, according to adaptive filter theory, the error signal is $$e(m)=x(m)-W_1^T \cdot n_{p1}(m)-W_2^T \cdot n_{p2}(m)-W_3^T \cdot n_{p3}(m)-W_4^T \cdot n_{p4}(m)- \ldots -W_x^T \cdot n_{px}(m)$$

Wherein, $W_1^T$ to $W_x^T$ may be the weight coefficients of respective X-stage adaptive filter according to each propeller. The filter weight coefficient of respective propeller noise channel may be adaptively controlled by using the error signal e(m). The e(m) thus obtained may be the target audio signal which may undergo noise cancellation process.

The optimal weight coefficient of adaptive filter may be obtained by calculating the minimum value of the cost function as defined below.

$$J(m) = \sum_{i=0}^{m} \lambda^{m-i} |x(m) - W_1^T \cdot n_{p1}(m) - W_2^T \cdot n_{p2}(m) - W_3^T \cdot n_{p3}(m) - W_4^T \cdot n_{p4}(m) - \ldots - W_x^T \cdot n_{px}(m)|^2$$

Letting $$\frac{\partial J(n)}{\partial w} = 0,$$

then an iterative computation for the optimal weight coefficient of filter may be:

$$W_1(m) = W_1(m-1) + k_1(m) \cdot e(m)$$

$$W_2(m) = W_2(m-1) + k_2(m) \cdot e(m)$$

$$W_3(m) = W_3(m-1) + k_3(m) \cdot e(m)$$

$$W_4(m) = W_4(m-1) + k_4(m) \cdot e(m)$$

...

$$W_x(m) = W_x(m-1) + k_x(m) \cdot e(m)$$

Wherein, the update value for the gain coefficient of filter may be expressed as:

$$\text{Coefficient of Propeller 1 } k_1(m) = \frac{P_1(m-1)}{\lambda + n_{p1}(m) \cdot P_1(m-1)}$$

$$\text{Coefficient of Propeller 2 } k_2(m) = \frac{P_2(m-1)}{\lambda + n_{p2}(m) \cdot P_2(m-1)}$$

$$\text{Coefficient of Propeller 3 } k_3(m) = \frac{P_3(m-1)}{\lambda + n_{p3}(m) \cdot P_3(m-1)}$$

$$\text{Coefficient of Propeller 4 } k_4(m) = \frac{P_4(m-1)}{\lambda + n_{p4}(m) \cdot P_4(m-1)}$$

...

$$\text{Coefficient of Propeller x } k_x(m) = \frac{P_x(m-1)}{\lambda + n_{px}(m) \cdot P_x(m-1)}$$

Wherein, the inverse matrix $P_x(m-1)$ of correlation matrix may be obtained by:

Propeller 1: $P_1(m) = \frac{1}{\lambda}[P_1(m-1) - k_1(m) \cdot n_{p1}(m) \cdot P_1(m-1)]$ Propeller 2: $P_2(m) = \frac{1}{\lambda}[P_2(m-1) - k_2(m) \cdot n_{p2}(m) \cdot P_2(m-1)]$ Propeller 3: $P_3(m) = \frac{1}{\lambda}[P_3(m-1) - k_3(m) \cdot n_{p3}(m) \cdot P_3(m-1)]$ Propeller 4: $P_4(m) = \frac{1}{\lambda}[P_4(m-1) - k_4(m) \cdot n_{p4}(m) \cdot P_4(m-1)]$

...

Propeller x: $P_x(m) = \frac{1}{\lambda}[P_x(m-1) - k_x(m) \cdot n_{px}(m) \cdot P_x(m-1)]$ An iterative computation may be executed with the following steps 1–6. The purpose of this iterative computation may be updating the initial value $W_x(0)=0$ so as to obtain the optimal $W_1(m)$, and the condition for this iterative computation may be $$\frac{\partial J(n)}{\partial w} = 0.$$

In the generic Multi-Channel RLS adaptive filter of FIG. 4, considering a tradeoff between a time for computation and a number of stages of the filter, a 4-stage adaptive filter may be adopted.

1. Setting the initial value for weight coefficient $W_x(0)=0$.
2. Setting the error signal as $$e(m)=x(m)-W_1^T \cdot n_{p1}(m)-W_2^T \cdot n_{p2}(m)-W_3^T \cdot n_{p3}(m)- W_4^T \cdot n_{p4}(m)- \ldots -W_x^T \cdot n_{px}(m).$$

Figure 5:
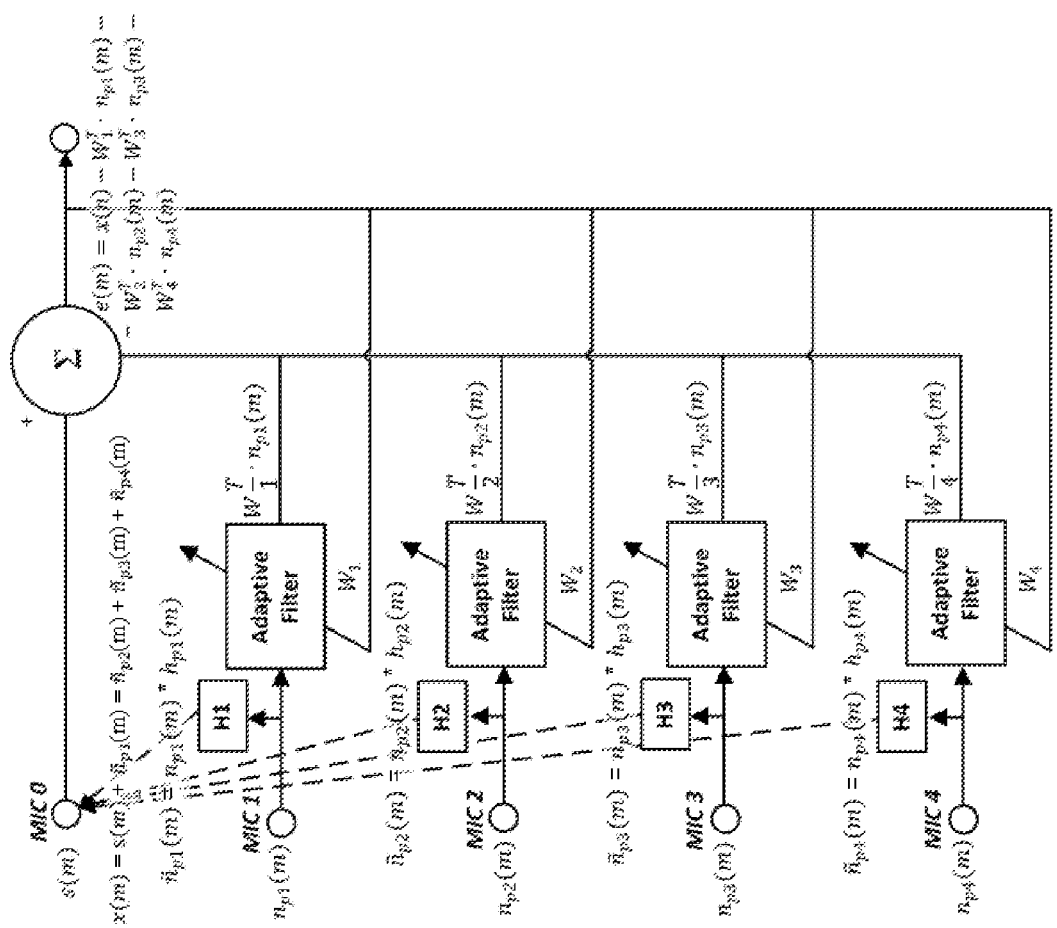
FIG. 5 shows a 4-Channel RLS adaptive filter to reduce the effects of the background noise in accordance with an embodiment of the disclosure.

3. Updating the gain coefficient $k_1(m)$, $k_2(m)$, $k_3(m)$, $k_4(m)$, ..., $k_x(m)$ of respective adaptive filter corresponding to respective propeller noise, by the equation discussed above.
4. Updating the inverse matrix $P_1(m)$, $P_2(m)$, $P_3(m)$, $P_4(m)$, ..., $P_x(m)$ of correlation matrix.
5. Updating weight coefficient $W_1(m)$, $W_2(m)$, $W_3(m)$, $W_4(m)$, ..., $W_x(m)$ of respective adaptive filter.
6. Repeating above steps until a predetermined condition of convergence being satisfied. In the explanatory embodiment of FIG. 4, the predetermined condition of convergence may be: |(e)(m)–s(m))/e(m)/e(m)<0.18. By above steps 1-6, the optimal $W_1(m)$ may be obtained FIG. 5 shows a 4-Channel RLS adaptive filter to reduce the effects of the background noise in accordance with an embodiment of the disclosure. The 4-Channel RLS adaptive filter of FIG. 5 may be considered as an example of the generic Multi-Channel RLS adaptive filter of FIG. 4 of which X is 4. The explanatory embodiment of FIG. 5 may be described with regard to UAVs, such as the UAV of FIGS. 2 and 3, that is, a four-rotor UAV, which is provided with four background microphones and one audio source collecting microphone. In the explanatory embodiment of FIG. 5, the noise produced by the propellers may be considered as the background noise.

The processor may adopt an adaptive filtering method to cancel the background noise. The filter parameters at current timing may be automatically adjusted according to an estimation error, by using the filter parameters at previous timing. The optimal filtering may be achieved by keeping a specific "cost function" minimum.

Any description herein of propeller noise may apply to noise from any other noise-producing components, such as those described elsewhere.

As shown in FIG. 5, the noise produced by four propellers may be collected by background microphones MIC 1 to MIC 4 as $n_{p1}(m)$, $n_{p2}(m)$, $n_{p3}(m)$ and $n_{p4}(m)$, respectively. The noise produced by the propellers may propagate and arrive at the target audio collecting microphone. The propeller noise arriving at the target audio collecting microphone may be defined as $\tilde{n}_{p1}(m)$, $\tilde{n}_{p2}(m)$, $\tilde{n}_{p3}(m)$ and $\tilde{n}_{p4}(m)$ respectively, which may be equivalent to a convolution with a transfer function $h_{px}(m)$:

$$\tilde{n}_{p1}(m)=n_{p1}(m)*h_{p1}(m)$$

$$\tilde{n}_{p2}(m)=n_{p2}(m)*h_{p2}(m)$$

$$\tilde{n}_{p3}(m)=n_{p3}(m)*h_{p3}(m)$$

$$\tilde{n}_{p4}(m)=n_{p4}(m)*h_{p4}(m)$$

The signal input into the target audio collecting microphone MIC 0 may be defined as:

$$x(m)=s(m)+\tilde{n}_{p1}(m)+\tilde{n}_{p2}(m)+\tilde{n}_{p3}(m)+\tilde{n}_{p4}(m)$$

Wherein, s(m) may be the target voice signal collected by the target audio collecting microphone MIC 0, $\tilde{n}_{px}(m)$ may be the propeller interference signal mixed into the target audio collecting microphone, and s(m) may be irrelevant to $\tilde{n}_{px}(m)$.

As shown in FIG. 5, according to adaptive filter theory, the error signal is $$e(m)=x(m)-W_1^T \cdot n_{p1}(m)-W_2^T \cdot n_{p2}(m)-W_3^T \cdot n_{p3}(m)- W_4^T \cdot n_{p4}(m)$$

Wherein, $W_x^T$ may be the weight coefficient of respective 4-stage adaptive filter according to each propeller. The filter weight coefficient of respective propeller noise channel may be adaptively controlled by using the error signal e(m). The e(m) thus obtained may be the target audio signal which may undergo noise cancellation process.

The optimal weight coefficient of adaptive filter may be obtained by calculating the minimum value of the cost function as defined below.

$$J(m) = \sum_{i=0}^{m} \lambda^{m-i} |x(m) - W_1^T \cdot n_{p1}(m) - W_2^T \cdot n_{p2}(m) - W_3^T \cdot n_{p3}(m) - W_4^T \cdot n_{p4}(m)|^2$$

Letting $$\frac{\partial J(n)}{\partial w} = 0,$$

then an iterative computation for the optimal weight coefficient of filter may be:

$$W_1(m)=W_1(m-1)+k_1(m) \cdot e(m)$$

$$W_1(m)=W_2(m-1)+k_2(m) \cdot e(m)$$

$$W_1(m)=W_3(m-1)+k_3(m) \cdot e(m)$$

$$W_1(m)=W_4(m-1)+k_4(m) \cdot e(m)$$

Wherein, the update value for the gain coefficient of filter may be expressed as:

Coefficient of Propeller 1 $k_1(m) = \dfrac{P_1(m-1)}{\lambda + n_{p1}(m) \cdot P_1(m-1)}$ Coefficient of Propeller 2 $k_2(m) = \dfrac{P_2(m-1)}{\lambda + n_{p2}(m) \cdot P_2(m-1)}$ Coefficient of Propeller 3 $k_3(m) = \dfrac{P_3(m-1)}{\lambda + n_{p3}(m) \cdot P_3(m-1)}$ Coefficient of Propeller 4 $k_4(m) = \dfrac{P_4(m-1)}{\lambda + n_{p4}(m) \cdot P_4(m-1)}$ Wherein, the inverse matrix $P_x(m-1)$ of correlation matrix may be obtained by:

Propeller 1: $P_1(m) = \dfrac{1}{\lambda}[P_1(m-1) - k_1(m) \cdot n_{p1}(m) \cdot P_1(m-1)]$ Propeller 2: $P_2(m) = \dfrac{1}{\lambda}[P_2(m-1) - k_2(m) \cdot n_{p2}(m) \cdot P_2(m-1)]$ Propeller 3: $P_3(m) = \dfrac{1}{\lambda}[P_3(m-1) - k_3(m) \cdot n_{p3}(m) \cdot P_3(m-1)]$ Propeller 4: $P_4(m) = \dfrac{1}{\lambda}[P_4(m-1) - k_4(m) \cdot n_{p4}(m) \cdot P_4(m-1)]$ An iterative computation may be executed with the following steps 1-6. The purpose of this iterative computation may be updating the initial value $W_x(0)=0$ so as to obtain the optimal $W_1(m)$, and the condition for this iterative computation may be $$\dfrac{\partial J(n)}{\partial w} = 0.$$

In the explanatory embodiment of FIG. 5, considering a tradeoff between a time for computation and a number of stages of the filter, a 4-stage adaptive filter may be adopted.
1. Setting the initial value for weight coefficient $W_x(0)=0$.
2. Setting the error signal as $e(m)=x(m)-W_1^T \cdot n_{p1}(m)-W_2^T \cdot n_{p2}(m)-W_3^T \cdot n_{p3}(m)-W_4^T \cdot n_{p4}(m)$.
3. Updating the gain coefficient $k_1(m)$, $k_2(m)$, $k_3(m)$, $k_4(m)$ of respective adaptive filter corresponding to respective propeller noise, by the equation discussed above.
4. Updating the inverse matrix $P_1(m)$, $P_2(m)$, $P_3(m)$, $P_4(m)$ of correlation matrix.
5. Updating weight coefficient $W_1(m)$, $W_2(m)$, $W_3(m)$, $W_4(m)$ of respective adaptive filter.
6. Repeating above steps until a predetermined condition of convergence being satisfied.

In the explanatory embodiment of FIG. 5, the predetermined condition of convergence may be: $|(e(m)-s(m))/e(m)|/e(m)<0.18$. By above steps 1-6, the optimal $W_1(m)$ may be obtained.

Figure 6:
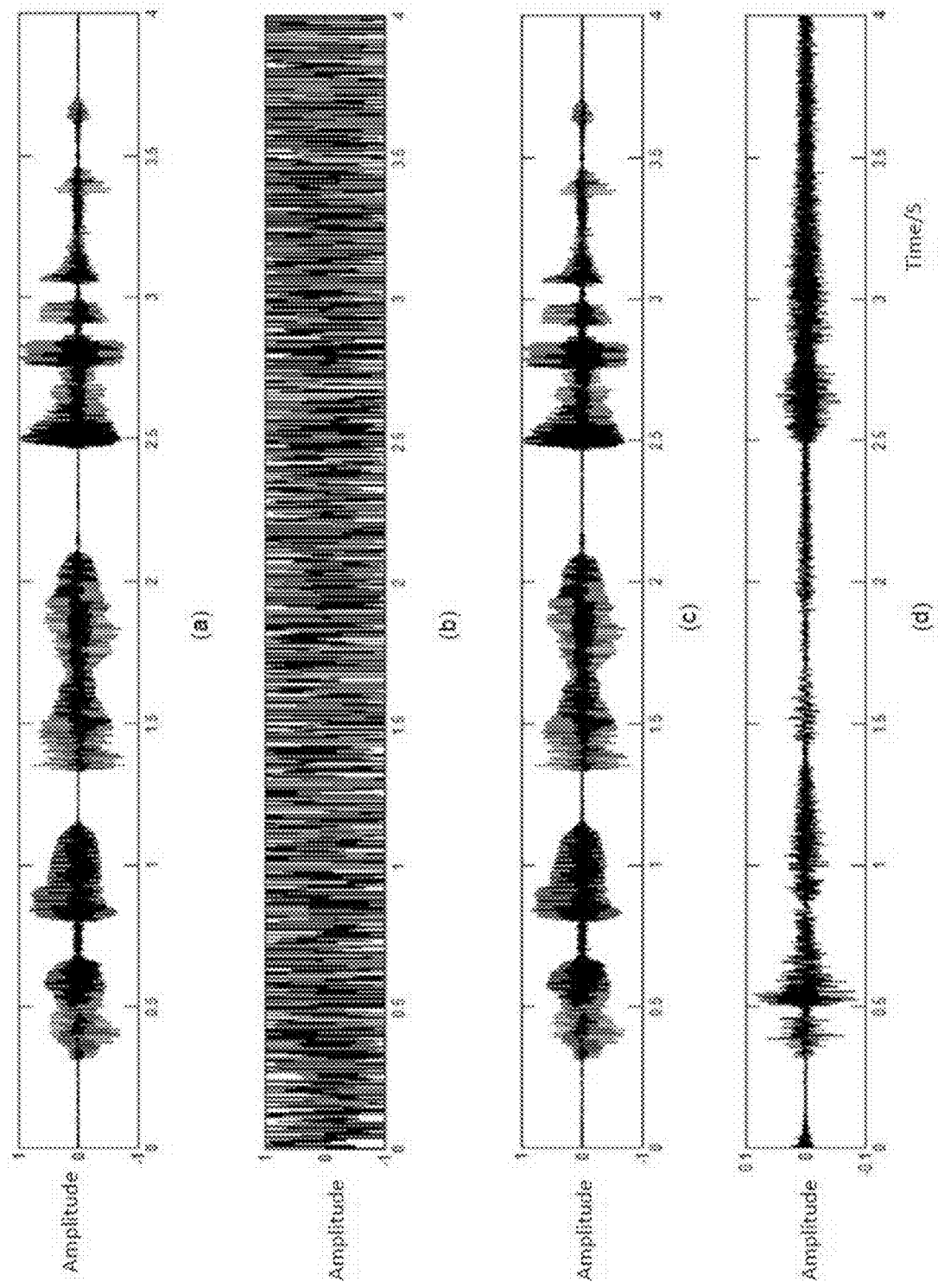
FIG. 6 shows an experimental result in reducing the effects of background noise with the UAV in accordance with an embodiment of the disclosure.

FIG. 6 shows an example of a reduction in the effects of background noise with the UAV in accordance with an embodiment of the disclosure.

FIG. 6(a) shows an amplitude-time diagram of the original target audio, which is not interfered by the background noise. The original target audio as shown may be collected by another audio source collecting microphone of same specification (e.g., sensitivity) as that used in the UAV, before the UAV of the disclosure is operating. Also, the original target audio as shown may be collected in the same scenario (e.g., height).

FIG. 6(b) shows an amplitude-time diagram of the target audio interfered by the background noise. This interfered signal may be collected by the audio source collecting microphone of the UAV in flight. The background noise may be provided by one or more noise-producing components on-board the UAV. This may include how the noise-producing components may actuate and/or interact with environmental conditions, such as wind.

FIG. 6(c) shows the processed signal, wherein the background noise is cancelled out from the audio data collected by the audio source collecting microphone. The processed signal may be closer to the original target audio than the target audio interfered by the background noise. In some instances, the processed signal may be greater than 50%, 70%, 80%, 90%, 95%, 99%, 99.5%, or 99.9% closer to the original target audio. The background microphones may pick up the background noise, and permit the signals of the background noise to be substantially reduced or removed from the audio data collected by the audio source collecting microphone, to leave the processed audio signal that is close to the original target audio.

FIG. 6(d) shows error in the noise cancellation. The error may be a difference between the original target audio of FIG. 6(a) and the processed signal of FIG. 6(c).

The experiment of FIG. 6 is carried on a four-rotor UAV that is equipped with one audio source collecting microphone and four background microphones, over 20 Hz to 20 KHz. In this experiment, the target audio as shown in FIG. 6(a) may be significantly interfered by the propeller noise produced when the UAV is in flight, as shown in FIG. 6(b). By the noise cancellation of the disclosure, the error in noise cancellation shown in FIG. 6(d), which is the difference between the original target audio of FIG. 6(a) and the processed signal of FIG. 6(c), may be satisfactory over the frequency, indicating that the background noise may have been removed.

The experiment of FIG. 6 may demonstrate that a system using one or more background microphones as claimed is satisfactory in that, when the SNR (Signal to Noise Ratio) of the background noise is −12 dB, a significant real-time noise cancellation effect may be obtained. Over the frequency range of 20 Hz to 20 KHz, an improvement of nearly 9 dB in SNR may be achieved. Greater improvement in SNR may be found in a circumstance with more intensive noise. In some instances, the improvement in SNR may be more than less than or equal to 1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, or 20 dB.

In some embodiments, the processed audio signal may be conveyed to a user. In some instances, the processed audio signal may be conveyed to a user by being conveyed to a speaker or other audio-emitting device. The user may hear the sound provided by the processed audio signal. The sound heard by the user may convey the sound of the target clearer than if the background noise were not removed. The processed audio signal may or may not be recorded. The processed audio signal may be stored in memory and may be transmitted and/or played back.

In one exemplary application, a UAV may include an audio source collecting microphone to record and/or transmit sounds from targets that may be provided beneath the UAV. For example, individuals may be holding a conversation beneath the UAV. This may be useful in situations where filming or recording of the individuals is occurring. Background noise from the UAV may interfere with collecting audio data from the targets. Thus, the noise cancellation processing may occur. This may occur on-board the UAV or off-board the UAV. This may occur in real-time while the UAV is in flight, which may enable a user to hear the processed signal in real-time. The user may optionally be remote to the target and/or the UAV. The user may be at a greater distance away from the target than the UAV. In some instances, the processed signal may be recorded and may be later played back. The signal may be processed at a later time. For instance, signals indicative of the data from the background microphone(s) and the audio source collecting microphones may be stored in memory. One or more processors may later cancel out some of the effects of the background noise using a Multi-Channel RLS technique or any other technique as described elsewhere herein. The processed signal may be played back to a user or used for any other purpose.

An observer viewing the UAV may hear the background noise generated by the UAV. For example, if an individual is the target or is near the target and the UAV is close by, the individual may hear the background noise of the UAV, such as the sound of propellers, carrier, motors, camera, or any other noise-producing component of the UAV. The noise cancellation that may occur with aid of one or more processors may result in the data being collected by the audio source collecting microphone to be processed to provide a signal with reduced background noise interference. However, to an individual physically present, the sound of the UAV may be unreduced.

In some embodiments, a UAV may employ an active noise cancellation technique that may reduce the sound of the UAV when viewed by an observer. The UAV may include one or more noise emitter that may emit noise into the environment. The noise emitted by the noise emitter may counteract some or all of the noise emitted by the noise producing components of the UAV in the environment. Thus, the individual standing near the UAV may not hear the noise from the noise-producing components of the UAV, or may hear a muffled or reduced noise from the noise-producing components of the UAV.

Figure 7:
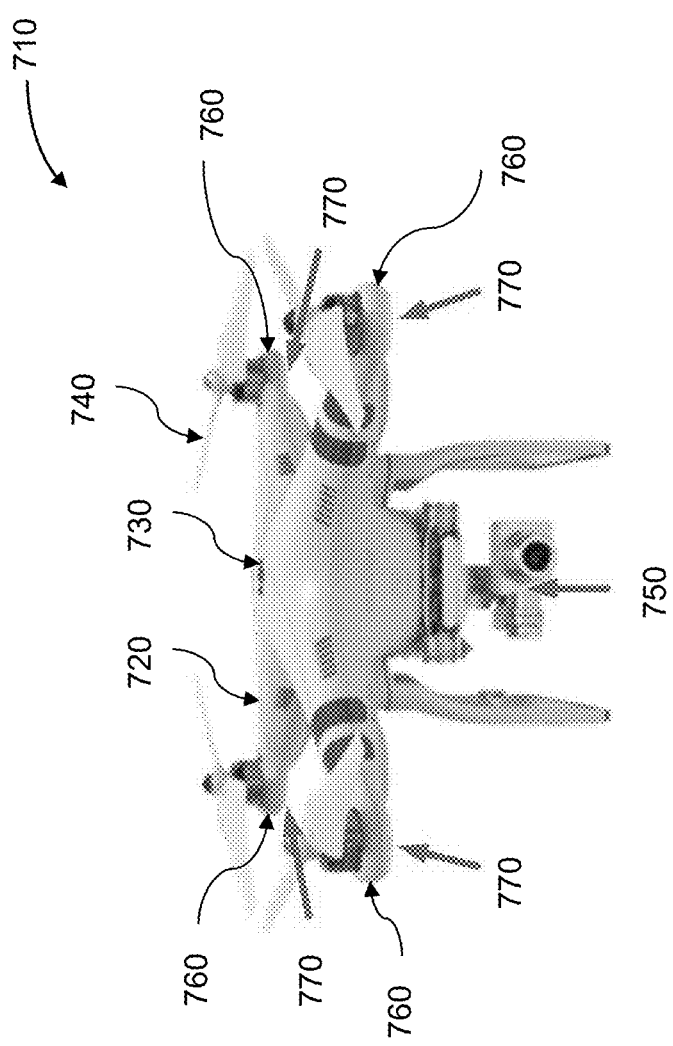
FIG. 7 shows an example of UAV provided with noise cancellers in accordance with an embodiment of the disclosure.

FIG. 7 shows an example of UAV to which noise cancellers are installed in accordance with an embodiment of the disclosure. The background noise-producing component and background microphone as shown in FIG. 7 may include or may be essentially the same as those described with reference to FIGS. 2 and 3. In some embodiments, additional active noise cancellers may be installed on the UAV within a predetermined proximity of the background noise-producing components to reduce the noise produced by the background noise-producing components.

As shown in FIG. 7, the UAV 710 may comprise four rotors/propellers 740 which are disposed at distal ends of the four arms 720. The four arms 720 may extend outward from the body 730 of UAV in a radial manner. The four arms and four rotors/propellers in this embodiment are exemplary. In other embodiments, any number of arms may be employed, as long as the number of arms matches the number of propulsion units, or rotors, of the UAV. In addition, the UAV 710 may carry various payloads including but not limited to carriers, cameras, and sensors.

In an explanatory embodiment of FIG. 7, four background microphones 760 may be respectively disposed at distal ends of the arms 720 of UAV in accordance with four propulsion units, and one audio source collecting microphone 750 may be disposed at a center portion of the UAV body. The background microphones 760 may collect background noise generated by the background noise-producing components (e.g., rotors/propellers 740). The audio source collecting microphone 750 may collect target audio, e.g., audio signal from interested people. Furthermore, four noise cancellers 770 may be provided corresponding to the four rotors/propellers 740 to cancel out the background noise generated by the background noise-producing components.

In some embodiments, active noise cancellers may be installed on the UAV. Any description herein of noise cancellers, noise emitters, or speakers may apply to any type of active noise cancellers. The term "active noise cancellers", also known as "active noise control", differentiates from traditional "passive" methods for controlling unwanted sound and vibration which may include insulation, silencers, vibration mounts, damping treatments, absorptive treatment.

In some embodiments, the active noise canceller may be a noise-cancellation speaker, which emits a sound wave with inverted phase to the original sound. The sound wave may have the same amplitude as the original sound. The sound wave may have the same amplitude with inverted phase as the original sound from a noise-generating component. The acoustic waves may combine and effectively cancel each other out. In some embodiments, some slight variation in amplitude and/or inverted phase from the original sound may be emitted by the noise-cancellation speaker. The noise-cancellation speaker may emit noise that may remove or reduce perception of the original sound. For instance, an observer may hear less than or equal to about 80%, 70%, 60%, 50%, 40%, 30%, 20%, 10%, 5%, or 1% of the original background noise. Sounds that are recurring and static in volume, such as a driving noise or a motor noise, may be more likely to be successfully canceled by an active noise canceller.

The noise-cancellation speaker may be a full-range, a woofer, a tweeter, or a mid-range. The cross-sectional shape of the noise-cancellation speaker may be arc or flat. The plane shape of the noise-cancellation speaker may be circle, oval, triangle, square, rectangle, rhombus, or polygon.

The noise-cancellation speaker may have a greatest dimension (e.g., length, width, height, diagonal, diameter) of no more than 100 cm. In some instances, the greatest dimension may be less than or equal to 1 mm, 3 mm, 5 mm, 7 mm, 1 cm, 1.5 cm, 2.0 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, 10 cm, 10.5 cm, 11 cm, 11.5 cm, 12 cm, 12.5 cm, 13 cm, 13.5 cm, 14 cm, 14.5 cm, 15 cm, 15.5 cm, 16 cm, 16.5 cm, 17 cm, 17.5 cm, 18 cm, 18.5 cm, 19 cm, 19.5 cm, 20 cm, 21 cm, 25 cm, 30 cm, 35 cm, 40 cm, 45 cm, 50 cm, 60 cm, 70 cm, 80 cm, 90 cm, or 100 cm. The noise-cancellation speaker may have a greatest dimension falling within a range between any two of the values described herein.

The noise-cancellation speaker may be lightweight. For example, the noise-cancellation speaker may weigh less than or equal to 1 mg, 10 mg, 30 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 h, 80 h, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, or 5 kg. The noise-cancellation speaker may have a weight falling within a range between any two of the values described herein.

The frequency range of the noise-cancellation speaker may at least cover the human audio spectrum of 20 Hz to 20 kHz. The lower limit of frequency range of the noise-cancellation speaker may be less than or equal to 5 Hz, 10 Hz, 20 Hz, 25 Hz, 30 Hz, 40 Hz, 50 Hz, 70 Hz, 80 Hz, 90 Hz, 100 Hz, 130 Hz, 150 Hz, 200 Hz, 500 Hz, 700 Hz, or 1 kHz, and the upper limit of frequency range of the noise-cancellation speaker may be larger than or equal to 2 KHz, 2.5 kHz, 3 kHz, 3.1 kHZ, 3.15 kHz, 3.2 kHz, 3.5 kHz, 4 kHz, 6 kHz, 8 kHz, 10 kHz, 12 kHz, 14 kHz, 16 kHz, 18 kHz, 19 kHz, 20 kHz, 30 kHz, 40 kHz, 50 kHz, 70 kHz, 80 kHz, or 100 kHz.

Sensitivity of a speaker is a measurement of the amount of sound output derived from a speaker with one watt of power input. Sensitivity of a speaker is specified in decibels (dB), using a one-watt test tone measured one meter away from the speaker. In some instances, the sensitivity of the noise-cancellation speaker may be larger than or equal to 50 dB, 55 dB, 60 dB, 65 dB, 70 dB, 73 dB, 75 dB, 78 dB, 80 dB, 83 dB, 85 dB, 88 dB, 90 dB, 93 dB, 95 dB, 98 dB, 100 dB, 103 dB, 105 dB, 108 dB, 110 dB, 113 dB, 115 dB, 118 dB, 120 dB, 125 dB, 130 dB, 140 dB, or 150 dB.

The speaker may emit noise in an omnidirectional manner. Alternatively the speaker may emit noise primarily in a single direction, two directions, or any number of multiple directions. The speaker may emit noise directed at an audio source collecting microphone. The speaker may or may not emit noise primarily in the direction of a background microphone.

In some embodiments, the noise canceller may be disposed directly on the background noise-producing components. For example, the noise cancellers may be disposed on propulsion units of the UAV for the best background noise cancelling. Alternatively, in some embodiments, the noise cancellers may be disposed within a predetermined proximity away from the background noise-producing components. In some embodiments, the active noise canceller may be disposed exterior to the background noise-producing components. For example, the active noise canceller may be located on the external side of a housing the propulsion unit. Alternatively, in some embodiments, the active noise canceller may be disposed inside of the background noise-producing components. For example, the active noise canceller may be located on an internal side of a housing of the propulsion unit.

In some embodiments, the noise canceller may be within a predetermined proximity of the background noise-producing component. The predetermined proximity between the noise canceller and the background noise-producing component may be less than or equal to 1 mm, 3 mm, 5 mm, 1 cm, 1.5 cm, 2 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, or 10 cm. The predetermined proximity may be less than or equal to any of the values described herein. The predetermined distance may fall within a range between any two of the values described herein. The noise canceller may be closer to the noise-producing component than an audio source collecting microphone. The noise canceller may be within 50%, 25%, 10%, 5%, or 1% of the distance between the noise-producing component and the audio source collecting microphone, to the noise-producing component. The noise-producing component may be positioned between the noise-producing component and the audio source collecting microphone.

In some embodiments, noise cancellers may be provided in accordance with the number of background noise-producing components. For example, for a multi-rotor UAV with four propulsion units each of which comprising a motor and a propeller, four active noise cancellers may be correspondingly provided, each cancelling the noise from corresponding propulsion unit. In some embodiments, additional noise cancellers may be provided for other payloads carried by the UAV. For example, additional noise cancellers may be provided for camera or gimbal to cancel the noise generated by these payloads. Optionally, the number of active noise cancellers may be less than the number of the background noise-producing components. For example, for a multi-rotor UAV with four propulsion units, only one, two or three noise cancellers may be provided to cancelling the noise from the four propulsion units. Alternatively, the number of active noise cancellers may be greater than the number of background noise-producing components. For example, for a multi-rotor UAV with four propulsion units, five, six, seven, eight, or more noise cancellers may be provided to cancel the noise from the four propulsion units. The number of active noise cancellers may equal the number of background noise-producing components. The active noise cancellers may be in close proximity to their respective background noise-producing components.

In some embodiments, a noise canceller may emit a sound to reduce or cancel the sound of a background noise-producing component to which it is dedicated. In other embodiments, the noise canceller may emit a sound to reduce or cancel the sound of multiple background noise-components. The sounds from the multiple background noise-producing components may be combined and/or analyzed to determine a sound for the noise canceller to produce.

In some embodiments, background microphone, which is configured to collect audio data including the background noise, may be disposed direct on the background noise-producing component. For example, the background microphones may be disposed on propulsion units of the UAV for the best background noise acquiring. Alternatively, in some embodiments, the background microphone may be disposed within a predetermined distance of the background noise-producing component. The background microphones may be disposed in any manner as described elsewhere herein, and may have any characteristic as described elsewhere herein.

In some embodiments, the predetermined distance between the background microphone and the background noise-producing component may be less than or equal to 1 mm, 3 mm, 5 mm, 1 cm, 1.5 cm, 2 cm, 2.5 cm, 3 cm, 3.5 cm, 4 cm, 4.5 cm, 5 cm, 5.5 cm, 6 cm, 6.5 cm, 7 cm, 7.5 cm, 8 cm, 8.5 cm, 9 cm, 9.5 cm, or 10 cm. The predetermined distance may be less than or equal to any of the values described herein. The predetermined distance may fall within a range between any two of the values described herein.

In some embodiments, the background microphone may be disposed beneath the rotor. In another embodiment, the background microphone may be disposed beneath the propeller. In a still embodiment, the background microphone may be disposed adjacent to the rotor or propeller. In order to collect the background noise signal from the propulsion unit more precisely, it is desirable that the background microphones are disposed as close to the background noise-producing components as possible. In some embodiments in which camera, gimbal or other payload is additionally carried by the UAV, additional background microphones may be provided to collect noise generated by these payloads.

In some embodiments, the noise canceller may be arranged together with or in close proximity to the corresponding background microphone, such that the amplitude of the audio signal emitted by the noise canceller may be identical to the amplitude of the background noise collected by the corresponding background microphone. Alternatively, in some embodiments, the predetermined distance of the noise canceller to the noise-producing component is a lesser distance than the predetermined distance of the background microphone to the noise-producing component.

In some embodiments, the UAV may be provided with at least one audio source collecting microphone configured to detect a target audio signal. In some embodiments, the audio source collecting microphone is disposed at a center portion of the UAV body. In order to collect the target audio signal from the source, the audio source collecting microphone may be installed beneath the UAV body. Optionally, the audio source collecting microphone may be installed at arbitrary position on the UAV, e.g., inside of the UAV body, on upper surface of the UAV body, or on lateral surface of the UAV body, as long as the audio source collecting microphone may collect target audio signal. The audio source collecting microphones may be disposed in any manner as described elsewhere herein, and may have any characteristic as described elsewhere herein.

In some embodiments, as shown in FIG. 7, the audio source collecting microphone 750 may be disposed at a center portion of the UAV body 730. In order to collect the target audio signal from the source, the audio source collecting microphone 750 may be installed beneath the UAV body 730. Optionally, the audio source collecting microphone 750 may be installed at arbitrary position on the UAV 710. For example, the audio source collecting microphone 750 may be either disposed inside of the UAV body, on upper surface of the UAV body, or on lateral surface of the UAV body, as long as the audio source collecting microphone 750 may collect target audio signal.

In some embodiments, the audio source collecting microphone 750 may be provided as an independent component. Alternatively, in some embodiments, the audio source collecting microphone 750 may be provided as an integrated component of the UAV or any payload. For example, the audio source collecting microphone may be integrated in the camera which may be a payload of the UAV.

In some embodiments, the audio source collecting microphone 750 may collect target audio signal from sources at a greater distance than the background microphones 760. This may be achieved, for example, by configuring the audio source collecting microphone 750 having a greater sensitivity than the background microphone 760. For better audio collecting, for example, the audio source collecting microphone 750 may be a unidirectional microphone, the polar pattern of which may be shotgun.

In some embodiments, the UAV may be provided with at least one processor, which is configured to receive a signal indicative of audio data collected by the at least one background microphone, and generate the audio signal to be emitted by the at least one noise canceller based on the received signals. The audio signal emitted by the noise canceller may have substantially the same amplitude but inverted phase as the audio data collected by the at least one background microphone. Any description herein of a processor may apply to one or more processors, which may have any arrangements or characteristics of processors described elsewhere herein.

The acoustic wave of the background noise and the acoustic wave emitted by the noise canceller may combine and effectively cancel each other out. In some embodiments, the acoustic wave of the background noise may be substantially weakened or reduced by the acoustic wave emitted by the noise canceller. Thus, at least at the audio source collecting microphone 750, the background noise produced by the background noise-producing component may be cancelled or reduced. In other words, at least at the audio source collecting microphone 750, the UAV is substantially quiet. The audio source collecting microphone 750 may not substantially collect the background noise produced by the background noise-producing component, and may collect the target audio signal only.

The background noise captured by the audio source collecting microphone may be reduced by at least 99%, 95%, 90%, 80%, 70%, 60%, 50%, 40%, 30%, 20%, or 10%. The sound emitted by the noise cancellers may reduce the effects of the background noise from the noise-producing components at the audio source collecting microphone. In some embodiments, the audio data captured by the audio source collecting microphone may be recorded and/or played back for a user. In some instances, further noise cancellation techniques may be put into place. For instance, noise cancellation techniques utilizing the background microphones near the noise-producing components or additional background microphones may be provided. In some instances, additional background microphones or the same background microphones may capture the reduced background noise and one or more processors may receive the reduced background noise signals, the audio signals collected by the audio source collecting microphone and generate a processed signal that may further reduce interference by background noise. This may occur using a Multi-Channel RLS technique as described elsewhere herein. Thus, combinations of active noise cancellation and signal processing to reduce effects of background noise may take place.

Figure 8:
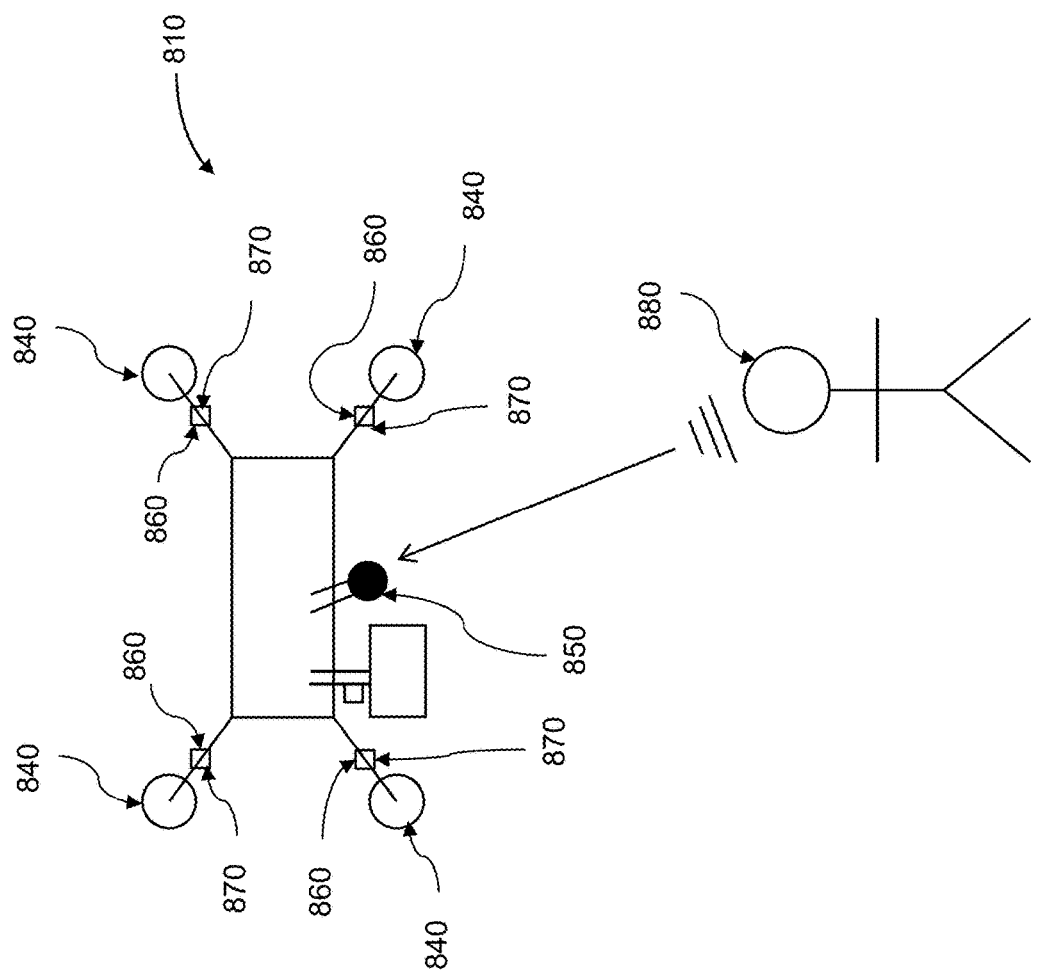
FIG. 8 shows an example of UAV provided with noise cancellers in accordance with an embodiment of the disclosure.

FIG. 8 shows an example of a UAV provided with noise cancellers in accordance with an embodiment of the disclosure. In the embodiment as shown for illustrative purpose, four background microphones 860 and four noise cancellers 870 may be correspondingly disposed for the four rotors/propellers 840 acting as the noise-producing components. The background microphone may be respectively installed beneath the rotor. The noise canceller may be disposed in close proximity to the background microphone. Optionally, the noise canceller may be disposed on the rotor or within a predetermined proximity of the rotor. In the embodiment as shown, the target audio signal may be the voice signal of a person 880 beneath the UAV 810. Alternatively, in some embodiments, the target audio signal may be from any moveable or still object with arbitrary positional relation with respect to the UAV.

Each background microphone may collect the background noise generated by a respective rotor. The background noise as collected by the background microphone, shown as a curve in an amplitude-time diagram, may be fed to a processor. The processor may generate an audio signal to be emitted by the corresponding noise canceller, based on the received signal, and control the corresponding noise canceller, e.g., a noise-cancellation speaker, to emit the audio signal having the same amplitude but inverted phase of the background noise collected by the background microphone.

The background noise from a rotor and the audio signal emitted by the noise canceller may substantially interfere and cancel each other out, at least at the position of an audio source collecting microphone 850. In other words, the UAV in flight may be substantially quiet, at least at the position of the audio source collecting microphone. Therefore, the audio source collecting microphone may not substantially collect the background noise produced by the rotor, and may collect the interested target audio signal only.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
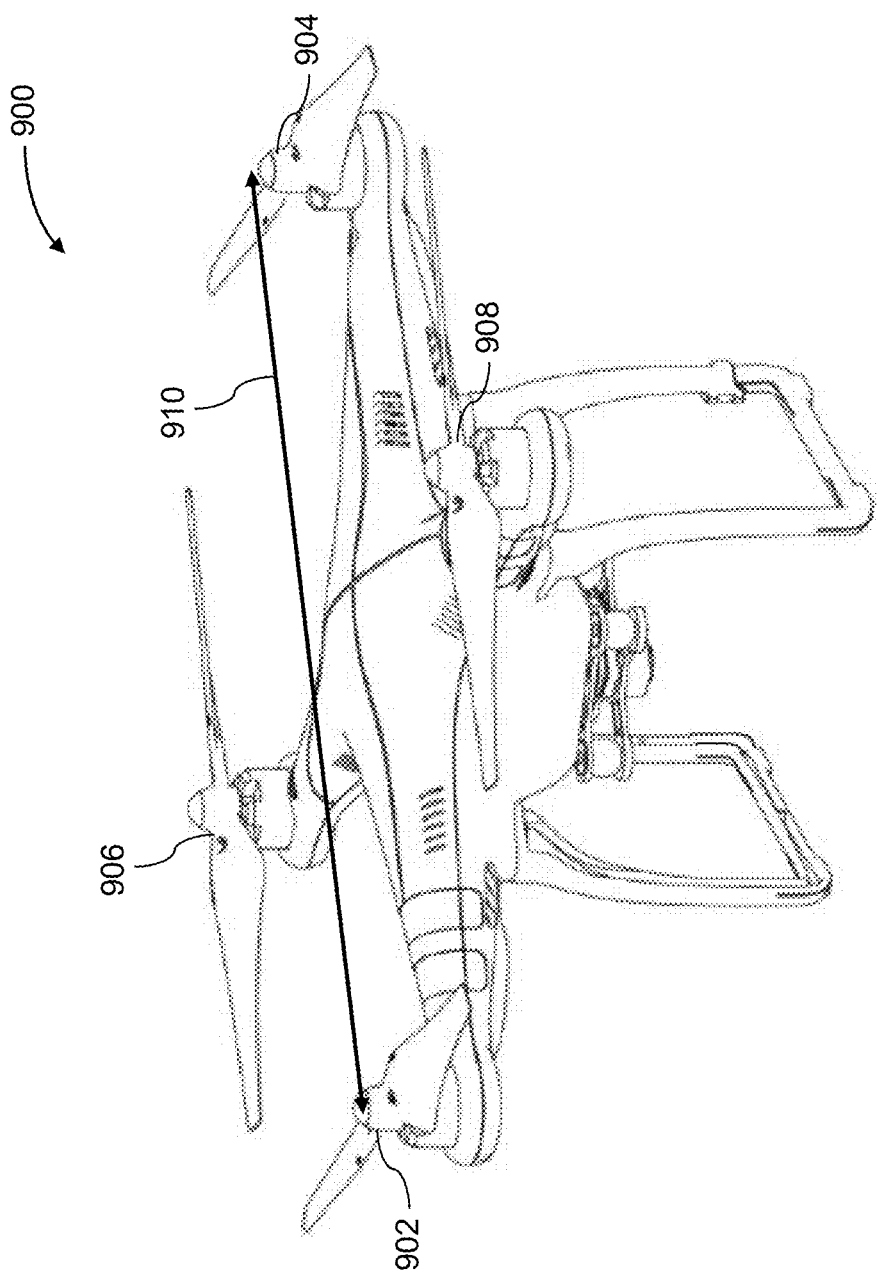
FIG. 9 illustrates an appearance of UAV in accordance with embodiments of the present disclosure.

FIG. 9 illustrates an unmanned aerial vehicle (UAV) 900, in accordance with embodiments of the present disclosure. The UAV may be an example of a movable object as described herein. The UAV 900 can include a propulsion system having four rotors 902, 904, 906, and 908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
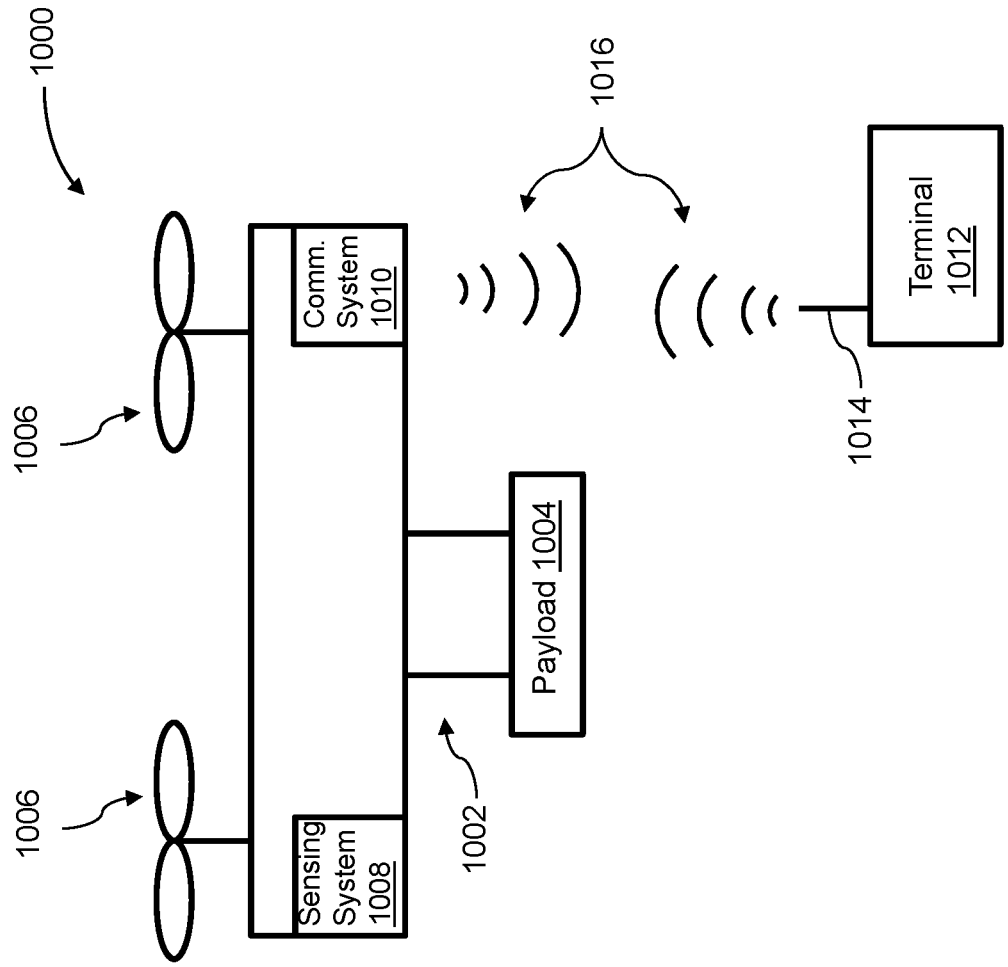
FIG. 10 illustrates a movable object including a carrier and a payload, in accordance with embodiments of the present disclosure.

FIG. 10 illustrates a movable object 1000 including a carrier 1002 and a payload 1004, in accordance with embodiments of the present disclosure. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a web site or server.

Figure 11:
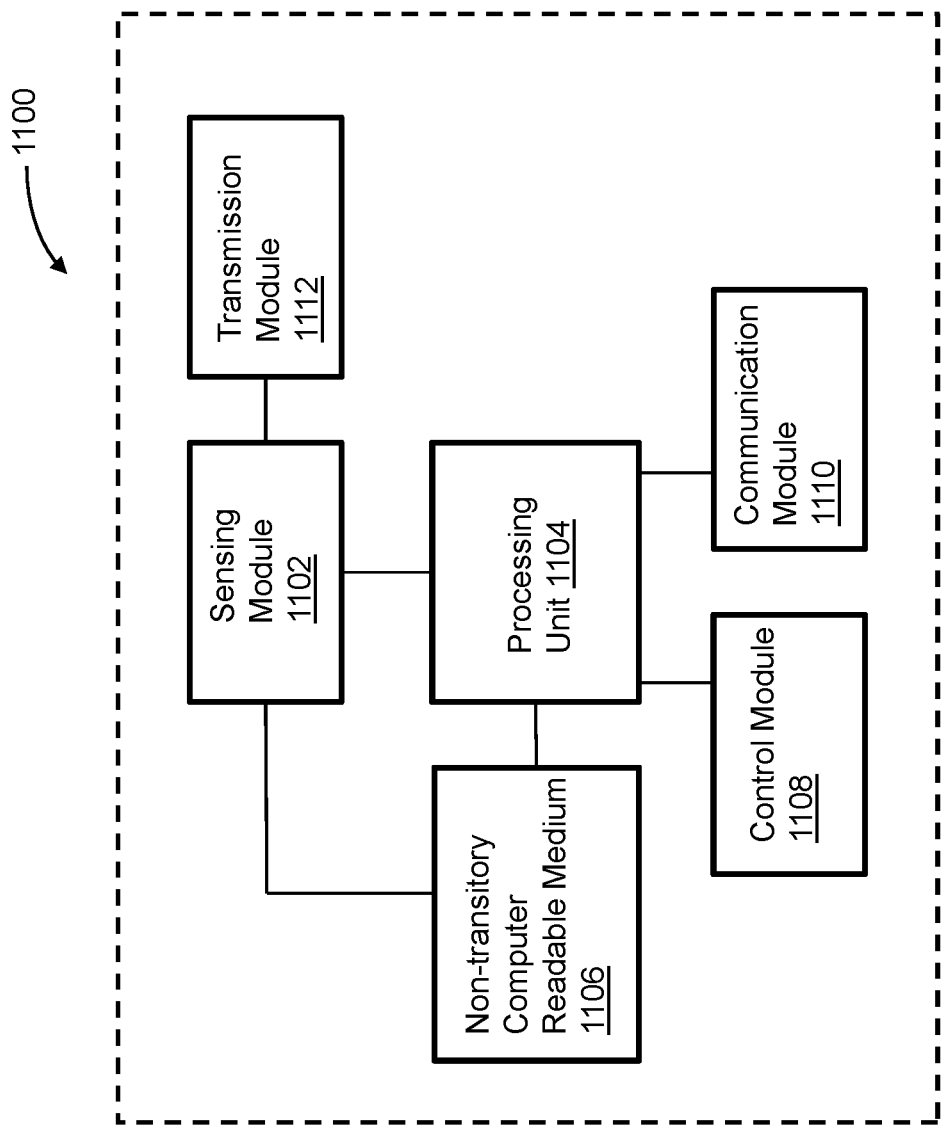
FIG. 11 is a schematic illustration by way of block diagram of a system for controlling a movable object, in accordance with embodiments of the present disclosure.

FIG. 11 is a schematic illustration by way of block diagram of a system 1100 for controlling a movable object, in accordance with embodiments of the present disclosure. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV) with audio filtering components, comprising:
   a plurality of background noise-producing components each configured to produce a background noise;
   an audio source collecting microphone configured to detect a target audio signal;
   a plurality of background microphones being in one-to-one correspondence with the plurality of background noise-producing components, each of the plurality of background microphones being:
      positioned between a corresponding one of the plurality of background noise-producing components and the audio source collecting microphone to collect audio data including the background noise; and
      positioned on a line that connects the corresponding one of the plurality of background noise-producing components and the audio collecting microphone; and
   a plurality of noise emitters being in one-to-one correspondence with the plurality of background noise-producing components and the plurality of background microphones, each of the plurality of emitters being:
      disposed within a proximity sufficiently close to a corresponding one of the plurality of background noise-producing components to reduce the background noise; and
      configured to emit an audio signal having a reverse phase of the audio data collected by a corresponding one of the plurality of background microphones that corresponds to the corresponding one of the plurality of background noise-producing components, to actively reduce the background noise; and
   a processor configured to, using a Multi-Channel Recursive Least Square adaptive filter, process the target audio signal collected by the audio source collecting microphone to generate a processed target audio signal having reduced background noise.

2. The UAV of claim 1, further comprising:
a processor configured to:
receive a signal indicative of the audio data collected by one of the plurality of background microphones, and
generate the audio signal to be emitted by one of the plurality of noise emitters corresponding to the one of the plurality of background microphones.

3. The UAV of claim 2, wherein:
the processor is further configured to receive a signal indicative of audio data collected by the audio source collecting microphone including the target audio signal, and
a distance between each background noise-producing component and the corresponding noise emitter is less than a distance between the corresponding noise emitter and the audio source collecting microphone.

4. The UAV of claim 3, wherein a distance between each background microphone and the corresponding background noise-producing component is less than a distance between the audio source collecting microphone and the corresponding background noise-producing component.

5. The UAV of claim 4, wherein a distance between each noise emitter and the corresponding background noise-producing component is less than the distance between the corresponding background microphone and the corresponding background noise-producing component.

6. The UAV of claim 3, wherein the target audio signal is generated from a source external to the UAV.

7. The UAV of claim 1, wherein the audio signal emitted by each noise emitter has an approximately same amplitude as the audio data collected by the corresponding background microphone.

8. The UAV of claim 1, further comprising:
a plurality of propulsion units each including a rotor,
wherein the plurality of background noise-producing components include the plurality of propulsion units.

9. The UAV of claim 8, wherein each of the plurality of background microphone is positioned beneath the rotor of one of the propulsion units.

10. The UAV of claim 1, wherein the plurality of background noise-producing components include at least one of a camera carried by the UAV or a carrier configured to support the camera and permit variation in orientation of the camera relative to the UAV.

11. The UAV of claim 1, wherein the audio source collecting microphone has a greater sensitivity than each of the plurality of background microphones to allow the audio source collecting microphone to better collect the target audio signal, the target audio signal including a signal generated by a source external to the UAV and the source having a distance from the UAV larger than a distance between each background noise-producing component and the corresponding background microphone.

12. The UAV of claim 1, wherein each noise emitter is disposed directly on the corresponding background noise-producing component.

13. The UAV of claim 1, wherein each noise emitter is configured to produce a sound that reduces or cancels the background noise produced by the corresponding background noise-producing component, such that an individual located proximate to the UAV does not hear the background noise or hears a muffled or reduced noise coming from the corresponding background noise-producing component.

14. The UAV of claim 1,
wherein the plurality of background microphones are a first group of background microphones configured to actively reduce the background noise,
the UAV further comprising:
a second group of background microphones configured to collect the reduced background noise,
wherein the processor is further configured to, using the Multi-Channel Recursive Least Square adaptive filter, filter and subtract the reduced background noise collected by the second group of background microphones from the target audio signal collected by the audio source collecting microphone.

15. A method of collecting audio data using an unmanned aerial vehicle (UAV), comprising:
detecting a target audio signal using an audio source collecting microphone;
collecting audio data using each of a plurality of background microphones on the UAV to collect a background noise from a corresponding one of a plurality of background noise-producing components, the background noise being different from a target audio signal, and the plurality of background microphones being in one-to-one correspondence with the plurality of background microphones, and each of the plurality of background microphones being:
positioned between a corresponding one of the plurality of background noise-producing components and the audio source collecting microphone;
positioned on a line that connects the corresponding one of the plurality of background noise-producing components and the audio collecting microphone;
emitting an audio signal to actively reduce the background noise using each of a plurality of noise emitters on the UAV and disposed within a proximity sufficiently close to a corresponding one of the plurality of background noise-producing components to reduce the background noise of each of the background noise-producing components, the plurality of noise emitters being in one-to-one correspondence with the plurality of background noise-producing components and the plurality of background microphones, and the audio signal emitted by each noise emitter having a reverse phase of the audio data collected by a corresponding one of the plurality of background microphones that corresponds to the corresponding one of the plurality of background noise-producing components; and
processing, using a Multi-Channel Recursive Least Square adaptive filter, the target audio signal collected by the audio source collecting microphone to generate a processed target audio signal having reduced background noise.

16. The method of claim 15, further comprising:
receiving, by a processor, a signal indicative of the audio data collected by one of the plurality of the background microphones; and
generating, by the processor, the audio signal to be emitted by one of the plurality of noise emitters corresponding to the one of the plurality of background microphones.

17. The method of claim 16, further comprising:
receiving, by the processor, a signal indicative of audio data collected by the audio source collecting microphone including the target audio signal,
wherein a distance between each background noise-producing component and the corresponding noise emitter is less than a distance between the corresponding noise emitter and the audio source collecting microphone.

18. The method of claim 17, wherein a distance between each background microphone and the corresponding background noise-producing component is less than a distance between the audio source collecting microphone and the corresponding background noise-producing component.

19. The method of claim 18, wherein a distance between each noise emitter and the corresponding background noise-producing component is less than the distance between the corresponding background microphone and the corresponding background noise-producing component.

20. The method of claim 17, wherein the target audio signal is generated from a source external to the UAV.

21. The method of claim 15, wherein the audio signal emitted by each noise emitter has an approximately same amplitude as the audio data collected by corresponding the background microphone.

22. The method of claim 15, wherein the plurality of background noise-producing components include a plurality of propulsion units of the UAV, each of the propulsion units including a rotor.

23. An unmanned aerial vehicle (UAV) with audio filtering components, comprising:
   a central body;
   a plurality of arms extending radially from the central body;
   an audio source collecting microphone located at the central body and configured to detect a target audio signal;
   a plurality of background noise-producing components each configured to produce a background noise, one of the plurality of background noise-producing components located at a distal end of one of the plurality of arms;
   a plurality of background microphones being in one-to-one correspondence with the plurality of background noise-producing components, one of the plurality of background microphones being:
      positioned between the distal end of the one of the plurality of arms and the audio source collecting microphone to collect audio data including the background noise;
      positioned on a line that connects the distal end of the one of the plurality of arms and the audio collecting microphone; and
   a plurality of noise emitter being in one-to-one correspondence with the plurality of background noise-producing components and the plurality of background microphones, one of the plurality of emitters being:
      disposed at the distal end of the one of the plurality of arms; and
      configured to emit an audio signal having a reverse phase of the audio data collected by the one of the plurality of background microphones, to actively reduce the background noise; and
   a processor configured to, using a Multi-Channel Recursive Least Square adaptive filter, process the target audio signal collected by the audio source collecting microphone to generate a processed target audio signal having reduced background noise.

* * * * *